US006891539B1

(12) United States Patent
Maruyama et al.

(10) Patent No.: US 6,891,539 B1
(45) Date of Patent: May 10, 2005

(54) PICTURE EDITING APPARATUS

(75) Inventors: Masahide Maruyama, Kanagawa (JP); Mitsuyoshi Shindo, Kanagawa (JP); Kiyosuke Suzuki, Saitama (JP); Hideki Wanami, Kanagawa (JP)

(73) Assignee: Sony Corporation, Tokyo (JP)

( * ) Notice: Subject to any disclaimer, the term of this patent is extended or adjusted under 35 U.S.C. 154(b) by 529 days.

(21) Appl. No.: 08/718,418

(22) PCT Filed: Feb. 8, 1996

(86) PCT No.: PCT/JP96/00276

§ 371 (c)(1),
(2), (4) Date: Sep. 30, 1996

(87) PCT Pub. No.: WO96/24909

PCT Pub. Date: Aug. 15, 1996

(30) Foreign Application Priority Data

Feb. 8, 1995 (JP) ............................................. 7-020822
Jun. 13, 1995 (JP) ............................................. 7-146354

(51) Int. Cl.⁷ ............................................. G06T 11/20
(52) U.S. Cl. ................................................... 345/435
(58) Field of Search ................................. 345/433, 434, 345/435, 436, 418, 419, 619, 620, 621, 622, 623, 624

(56) References Cited

U.S. PATENT DOCUMENTS

| 4,731,743 A | | 3/1988 | Blancato ..................... 364/521 |
| 4,779,135 A | * | 10/1988 | Judd ........................... 348/565 |
| 5,293,475 A | | 3/1994 | Hennigan et al. ........... 395/148 |
| 5,459,826 A | | 10/1995 | Archibald ................... 395/147 |

FOREIGN PATENT DOCUMENTS

| EP | 0282997 A2 | 9/1988 |
| EP | 0585074 A2 | 3/1994 |
| JP | 4-195472 | 7/1992 |
| WO | 95/02224 | 1/1995 |
| WO | 95/02867 | 1/1995 |

* cited by examiner

Primary Examiner—Cliff N. Vo
(74) Attorney, Agent, or Firm—Bell, Boyd & Lloyd LLC

(57) ABSTRACT

A first editor memory is supplied with picture data that a user has selected, a second editor memory is supplied with a template that the user has selected, and a key memory is supplied with a key information that the user has selected. A switch inserts the picture data into the template in accordance with key information to deliver it to a video memory. A picture synthesis section inserts the picture data stored in the first editor memory into the picture insertion area designated by the key information within the template stored in the second editor memory in accordance with instruction from the user.

26 Claims, 20 Drawing Sheets

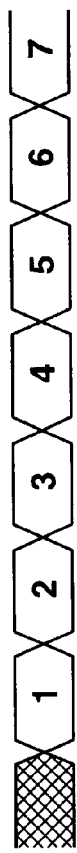 FIG.6A  AR1 INTEGRAL PART (A0~)
 FIG.6B  AR2 INTEGRAL PART (A0~)
 FIG.6C  MEMORY SELECT
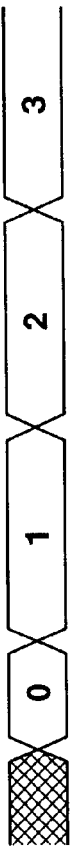 FIG.6D  AR1 PHYSICAL ADDRESS
 FIG.6E  AR2 PHYSICAL ADDRESS

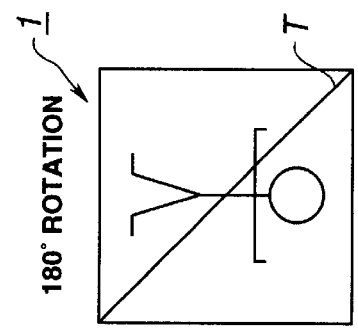
FIG.11D 180° ROTATION
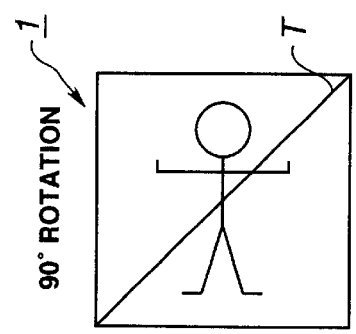
FIG.11C 90° ROTATION
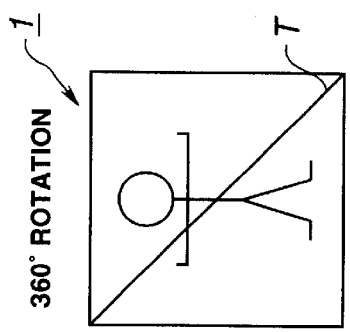
FIG.11G 360° ROTATION
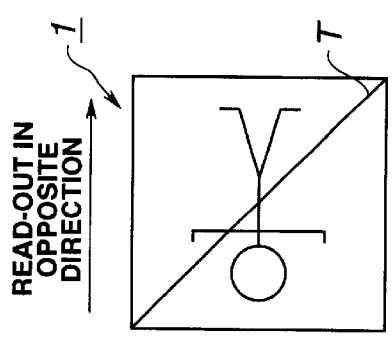
FIG.11B READ-OUT IN OPPOSITE DIRECTION
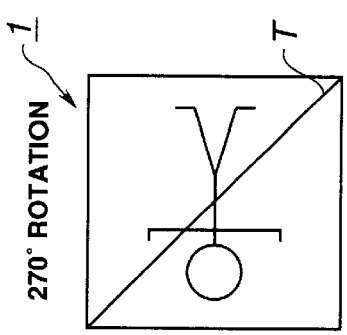
FIG.11F 270° ROTATION
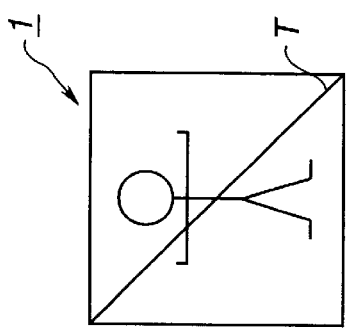
FIG.11A
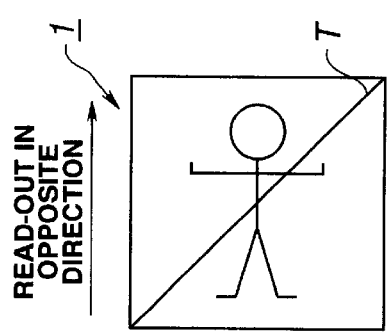
FIG.11E READ-OUT IN OPPOSITE DIRECTION SINCE "41H" OF "ASCII CODE" IS "A", DEVELOPMENT INTO PICTURE DATA (24×24 FONTS IN THIS CASE) OF "A" IS CARRIED OUT

PASTING UP AT PORTION BELOW SMALL PICTURE

PICTURE EDITING APPARATUS

TECHNICAL FIELD

This invention relates to a picture editing apparatus suitable in equipment for handling picture data, and more particularly to a picture editing apparatus for synthesizing a designated picture in a designated area within the insertion pattern.

BACKGROUND ART

Hitherto, in the case of inserting a picture recorded on a film, etc. into, e.g., an insertion pattern, there is carried out a so called multiple exposure to allow the insertion pattern to be exposed to light in the state where the picture insertion area into which picture of printing (photographic) paper is inserted is light-shielded thereafter to carry out exposure by picture recorded on film, etc. in the state where the area except for the picture insertion area is light-shielded.

In addition to the above, in order to prepare a synthetic picture, a method using a general purpose computer, for example, is known. In accordance with such a method, a film is first read by, e.g., a film scanner, etc. to convert picture (pictorial image) recorded on the film into picture data to input it to the general purpose computer, etc. Then, picture editor which carries out editing of picture data, is used to insert picture data into the area designated by a user on an insertion pattern prepared in advance.

However, in the case of preparing a synthetic picture by the multiple exposure as described above, it is necessary to carry out a plural number of exposure operations and development operations of the printing paper. As a result, complicated operation is required. In addition, it takes a lot of time to prepare a synthetic picture. For this reason, it is difficult to change the position where the picture is synthesized and/or trimmed, for example, while confirming the prepared synthetic picture to carry out the picture synthesis, and the operability is thus poor. As a result, the working efficiency is low.

Moreover, as described above, in the preparation of synthetic picture using the general purpose computer, the cost of the entirety of the apparatus is increased, but a wide variety of processing can be made. To the contrary, in order to prepare a synthetic picture, complicated operations such as selection of the synthetic picture, designation of trimming and setting of picture synthesis position, and so on required. In addition, with such A general purpose computer, there are problems such as low picture processing speed of synthesis of picture data, and poor operability.

This invention has been made in view of the above-described problems, and its object is to provide a picture editing apparatus which can improve working efficiency, and which can improve operability.

DISCLOSURE OF THE INVENTION

In a picture editing apparatus according to this invention, an approach is employed to control, on the basis of the operation of an operator by control means, a write-in operation into a first memory for storing picture data, a second memory for storing insertion pattern for inserting the picture data, and a key memory for storing key information corresponding to the insertion pattern, having area designation information for designating the area of picture data stored in the first memory, and to control read-out operation from the first memory of the picture data and read-out operation from the second memory of the insertion pattern on the basis of the key information so that the picture data is inserted with respect to the area indicated by the key information within the insertion pattern.

In the picture editing apparatus according to this invention, the control means conducts a control by read-out control means to read out, from a first recording medium, the picture data stored into the first memory, and to read out, from a second recording medium, the insertion pattern and the key information stored into the second memory.

Moreover, in the picture editing apparatus according to this invention, the read-out control means reads out the insertion pattern from a pattern recording area of the second recording medium having the pattern area where the insertion pattern is recorded and a key information recording area where the key information is recorded, and reads out the key information from the key information recording area.

Further, in the picture editing apparatus according to this invention, the control means carries out picture processing of the picture data on the basis of picture processing information included in the key information so as to correspond to the insertion pattern thereafter to insert the picture data thus processed into the insertion pattern.

Further, in the picture editing apparatus according to this invention, the control means changes or modifies the picture data so as to correspond to shape data included in the key information to insert the picture data thus obtained into the insertion pattern.

Further, in the picture editing apparatus according to this invention, the control means changes or modifies size of the picture data so as to correspond to enlargement/contraction data included in the key information to insert the picture data thus obtained into the insertion pattern.

Further, in the picture editing apparatus according to this invention, the control means changes or modifies direction of the picture data so as to correspond to direction data included in the key information to insert the picture data thus obtained into the insertion pattern.

Further, a picture editing apparatus according to this invention is operative to control on the basis of the operation of an operator by control means, write-in operation into a first memory for storing picture data, a second memory for storing an insertion pattern for inserting the picture data, and a key memory for storing key information consisting of area designation information which is information corresponding to the insertion pattern and designates area of the picture data stored in the first memory and picture processing information for designating picture processing carried out with respect to the picture data stored in the first memory, and to control the read-out operation from the first memory of the picture data and the read-out operation from the second memory of the insertion pattern so that picture processing is implemented to the picture data on the basis of the picture processing information and the picture data is inserted with respect to the area indicated by the area designation information within the insertion pattern.

In the picture editing apparatus according to this invention, the control means changes or modifies the picture data so as to correspond to shape data included in the picture processing information to insert the picture data thus obtained into the insertion pattern.

Further, in the picture editing apparatus according to this invention, the control means changes or modifies size of the picture data so as to correspond to enlargement/contraction data included in the key information to insert the picture data thus obtained into the insertion pattern.

In addition, in the picture editing apparatus according to this invention, the control means changes or modifies direction of the picture data so as to correspond to direction data included in the key information to insert the picture data thus obtained into the insertion pattern.

BRIEF DESCRIPTION OF THE DRAWINGS

FIGS. 6A–6E are time charts for explaining the address data for respective memory areas generated by the address generating circuit.

FIGS. 11A–11G are model views for explaining the rewrite operation of frame memory at the time of the rotation processing.

BEST MODE FOR CARRYING OUT THE INVENTION

Preferred embodiments of this invention will now be described in detail with reference to the attached drawings.

Figure 1:
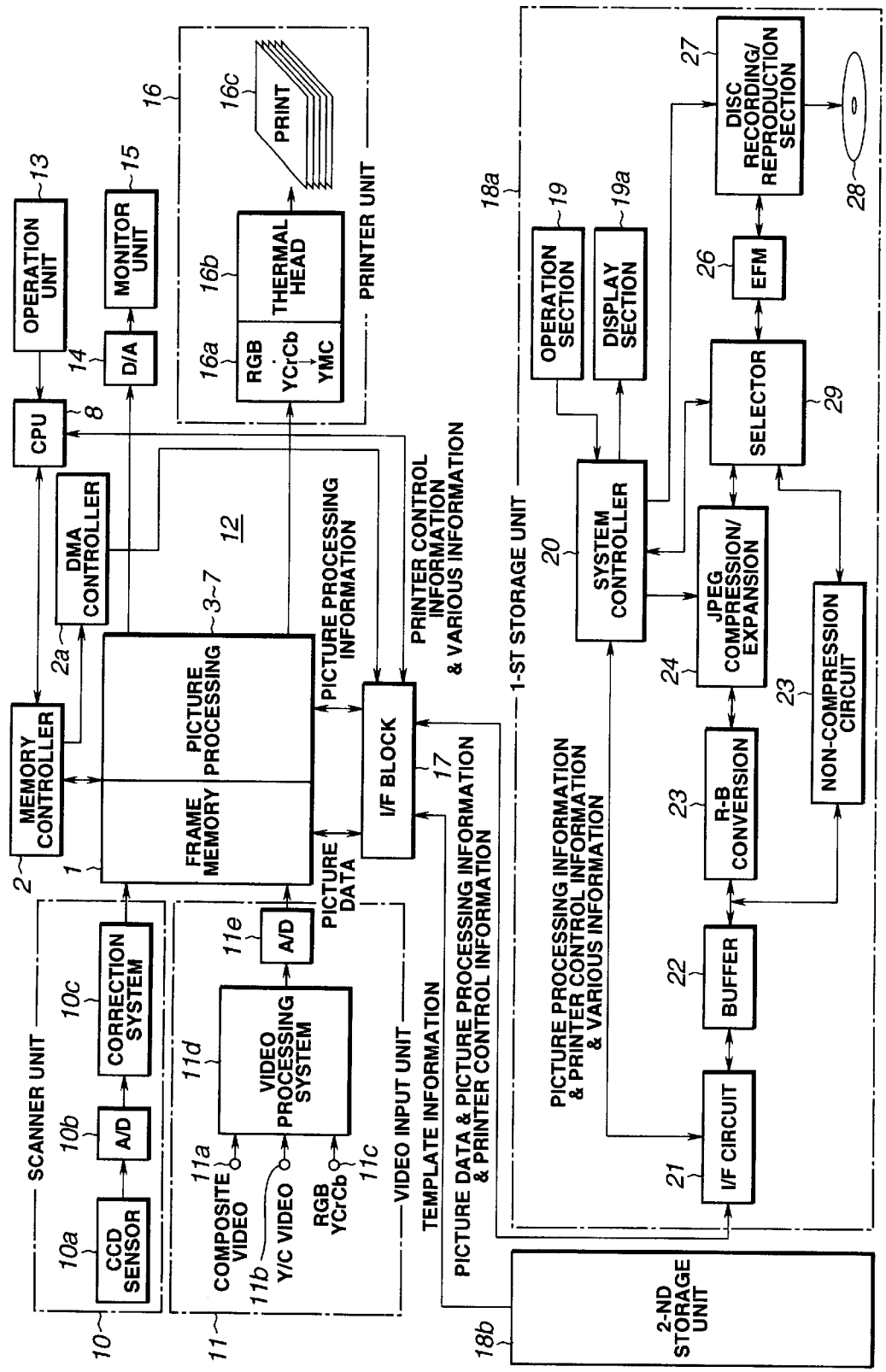
FIG. 1 is a block diagram showing the configuration of a still picture recording/reproduction system to which a picture processing apparatus according to this invention is applied.

A picture editing apparatus according to a first embodiment of this invention is applied to such a still picture recording/reproduction system as shown in FIG. 1 to record, onto an optical disc, picture data delivered from a video tape recorder equipment, etc. or picture data formed by reading picture (pictorial image) from film on photograph, etc. by scanner to reproduce such picture data to display them on a monitor unit, and to carry out print thereof on a print paper.

In the FIG. 1 mentioned above, the still picture recording/reproduction system comprises a frame memory 1 having plural memory areas divided as a memory area and adapted for storing picture data into these respective memory areas, a memory controller 2 for controlling write-in and read-out operations of picture data with respect to the frame memory 1, a CPU (Central Processing Unit) 8 for carrying out the operation control of the entirety of the still picture recording/reproduction system, and a Direct Memory Access (DNLA) controller 2a, which will be described later, for transferring, at a high speed, command data for designating processing of picture data, etc. along with the picture data without intervention of the CPU 8.

Moreover, the still picture recording/reproduction system comprises a scanner unit 10 for reading pictures (pictorial images) from film or photograph, etc. to form picture data, a video input unit 11 for forming picture data suitable for the still picture recording/reproduction system on the basis of the picture data delivered from external equipment such as a video tape recorder device or a camera device, etc., and first and second storage units 18a, 18b for carrying out, with respect to a recording medium, recording and reproduction of picture data, etc. delivered from the scanner unit 10 or the video input unit 11.

Moreover, the still picture recording/reproduction system comprises a picture processing block 12 for implementing picture processing such as enlargement, contraction, dissolve, and the like to the picture data delivered from the scanner unit 10, the video input unit 11 or the storage units 18a, 18b to the frame memory 1, an operation unit 13 on which plural keys for designating recording/reproduction and/or picture processing, etc. of picture data are provided, a monitor unit 15 for displaying picture image corresponding to the picture data to which the picture processing, etc. has been implemented, and a printer unit 16 for carrying out print operation of the picture data to which the picture processing, etc. has been implemented.

Figure 2:
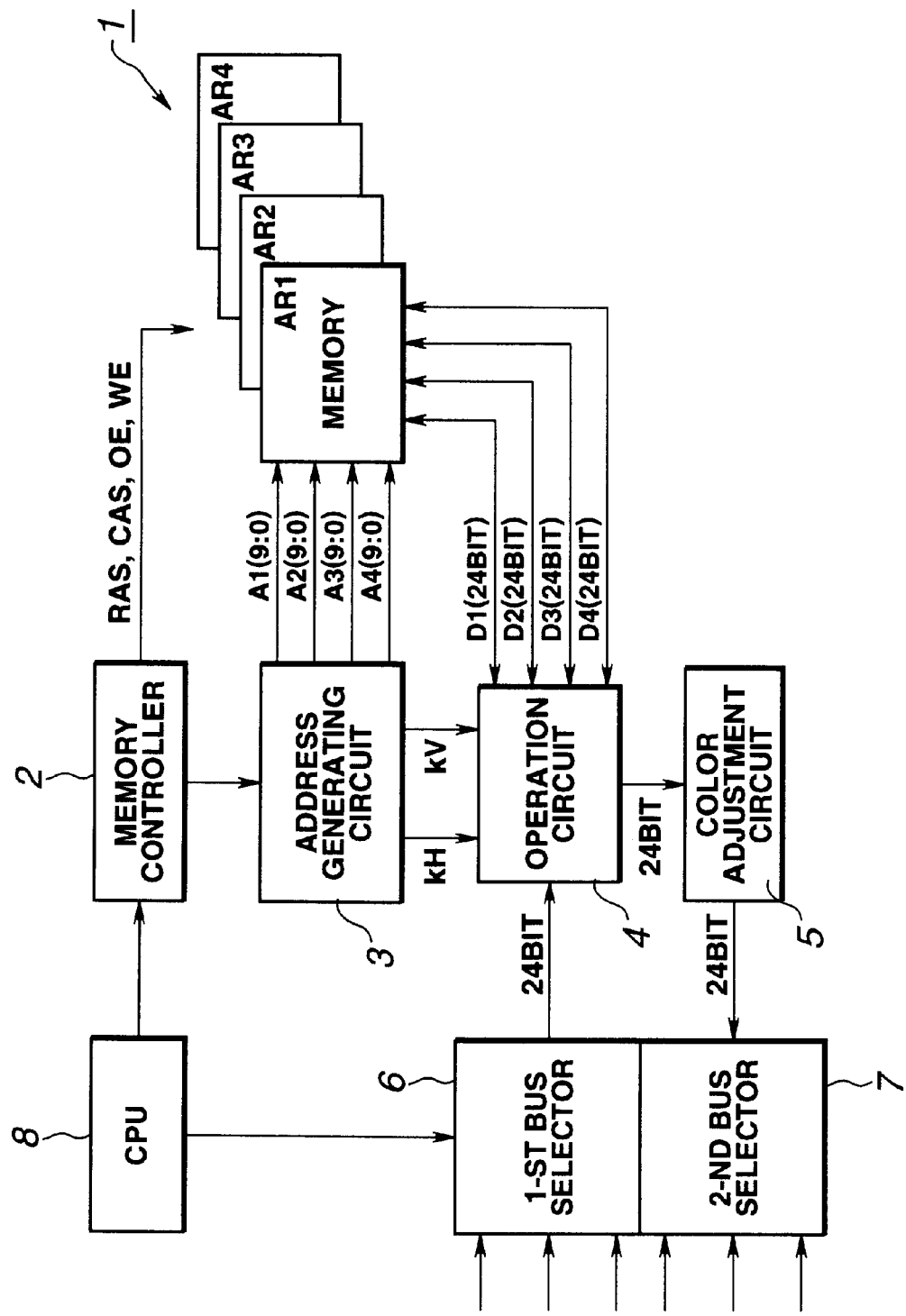
FIG. 2 is a block diagram showing the configuration of a picture processing block provided in the still picture recording/reproduction system.

The picture processing block 12 has a configuration as shown in FIG. 2, and includes an address generating circuit 3 for forming write (write-in) address and read (read-out) address formed by the integral part and the fraction part which will be described later for every respective memory areas of the frame memory 1 on the basis of write (write-in) control data and read (read-out) control data from the memory controller 2 to deliver write address and read address of the integral part to the frame memory 1, and an operation (computational) circuit 4 for carrying out (arithmetic) operation of the picture processing on the basis of the write address and the read address of the fraction part delivered from the address generating circuit 3 and the picture data which has been read out from the frame memory 1.

Moreover, the picture processing block 12 includes a color adjustment (control) circuit 5 for implementing tone conversion to the picture data which has been caused to undergo picture processing by the operation circuit 4, a first bus selector 6 for selecting picture data delivered from plural external devices to deliver the selected data to the operation circuit 4, and a second bus selector 7 for selecting an external device to which picture data from the color adjustment circuit 5 should be supplied to output it.

The frame memory 1 is constituted with a frame memory for R from and into which picture data for red (R) is subjected to read/write operation, a frame memory for G from and into which picture data of green (G) is subjected to read/write operation, and a frame memory for blue B from and into which picture data for blue (B) is subjected to read/write operation.

The frame memories for respective colors are respectively constituted from a theoretical point of view by eight DRAMs (Dynamic RAMs) in total so as to have memory area of 2048×2048×8 bits, which are obtained by arranging four DRAMs having memory area of 4M bits in total such that, e.g., the dimensional relationship of length, breadth and depth is expressed as 1024 pixels×1024 pixels×4 bits so as to respectively form square shape to stack such four DRAMs arranged in square form by two lines in the depth direction.

Further, the frame memory 1 is constituted from a theoretical point of view by respectively stacking the frame memories for respective colors having the memory area of 2048×2048×8 bits in order of, e.g., R, G and B in the depth direction. Accordingly, the frame memory 1 has a memory area of 2048×2048×24 bits.

The operation of the still picture recording/reproduction system having such a configuration will now be described.

Initially, in the case of recording a desired picture data onto an optical disc 28 of the storage units 18a, 18b, the user operates the operation unit 13 to designate destination of taking-in of picture data (the scanner unit 10 or the video input unit 11), and sets destination of output of the picture data thus taken in to the storage units 18a, 18b.

Thus, the CPU 8 controls the scanner unit 10 or the video input unit 11 so that it is placed in operable state, and controls the picture processing block 12 and an interface block 17 so that picture data is outputted to the storage units 18a, 18b.

The scanner unit 10 is adapted to have an ability to read both pictures of reflection manuscript and transmission manuscript. In more practical sense, the scanner unit 10 can read, as the reflection manuscript, e.g., photograph of E size, photograph of L size, and photograph of A6 size, and can read, as the transmission manuscript, negative film of 35 mm and Brownie size. It is to be noted that the scanner unit 10 can also read, as the reflection manuscript, manuscript obtained by allowing the negative film of 35 mm or Brownie size to undergo print at the original size.

The scanner unit 10 is adapted so that when photograph, etc. is mounted on the manuscript reading table, it scans this manuscript by a CCD line sensor 10a to read picture image corresponding thereto. The CCD line sensor 10a forms a picture signal corresponding to the picture thus read to deliver it to an A/D converter 10b. The A/D converter 10b digitizes the picture signal delivered from the CCD line sensor 10a to thereby form picture data to deliver it to a correction system 10c. In the case where reading of the picture is carried out from, e.g., the 35 mm film, the correction system 10c corrects the picture data so that it is changed into picture data in which the size of length×breadth is the size of 1200 pixels×1700 pixels to output the picture data thus corrected. Moreover, in the case where manuscript to be read is film of the Brownie size, a photograph of E size, a photograph of L size, or a photograph of A6 size, the correction system 10c corrects them so that they are changed into picture data in which their sizes of length×breadth are respectively the sizes of 1298 pixels×975 to 1875 pixels, 1050×1450 pixels, 1120 pixels×1575 pixels, and 1325 pixels×1825 pixels to output the picture data thus corrected.

The video input unit 11 can be supplied with video signals of three formats of composite video signal, video signal delivered in the Y (luminance)/C (chroma) separate format, and video signal delivered in the format of RGB from, e.g., video tape recorder equipment, etc. These video signals are delivered to a video processing system 11d respectively through input terminals 11a to 11c.

The video processing system 11d changes pixels of the video signals of the respective formats into pixels of cubic lattice and allows the picture size to have 480 pixels×640 pixels to deliver such video signals to an A/D converter lie. The A/D converter 11e digitizes the video signals to thereby form picture data corresponding to the video signals of the respective formats to output them.

The respective picture data formed by the scanner unit 10 or the video input unit 11 are delivered to the picture processing block 12. The picture processing block 12 is operative so that in the case where picture processing such as enlargement processing, contraction processing, rotation processing or dissolve processing, etc. which will be described later is designated, it implements such picture processing to the picture data to add picture processing information relating to the picture processing to the picture data to output them. These picture data (and the picture processing information) are delivered to a D/A converter 14, and are delivered to an interface circuit 21 of the storage units 18a, 18b through the interface block 17.

The D/A converter 14 converts the picture data into picture data in analog form to thereby form a picture signal to deliver it to the monitor unit 15. Thus, picture image is displayed on the monitor unit 15 in accordance with the picture data which has been taken in from the film or the photograph, etc.

On the other hand, in the case where the picture image displayed on the monitor unit 15 is the desired picture, the user operates the operation section 19 of the storage units 18a, 18b to designate recording of that picture image.

Thus, the system controller 20 of the storage units 18a, 18b controls the interface circuit 21 so as take therein to the picture data delivered from the picture processing block 12. Picture processing information relating to the picture processing which has been implemented at the picture processing block 12, is added to the picture data which has been taken in through the interface circuit 21 in addition to the picture data as described above. For this reason, the system controller 20 takes therein to only the picture processing information from the picture data and the picture processing information taken therein to through the interface circuit 21 to deliver the picture data thus taken in to a buffer circuit 22.

The buffer circuit 22 amplifies the picture data at a predetermined gain to deliver it to a raster/block converting circuit 23 and a non-compression circuit 25. The non-compression circuit 25 delivers that picture data to a selector 29 as it is as picture data for high resolution without implementing compression processing to the picture data. Moreover, the raster/block converting circuit 23 forms compression block consisting of predetermined number of pixels which is one unit of the compression processing on the basis of the picture data to deliver it to a compression/expansion circuit 24. The compression/expansion circuit 24 implements, for example two kinds of compression processing of resolutions different from each other every for compression block to thereby form picture data of intermediate resolution and picture data of low resolution to deliver them to the selector 29.

The selector 29 is subjected to switching control by the system controller 20. The respective picture data of high resolution, intermediate resolution and low resolution caused to be through the selector 29 are delivered to an EFM circuit (Eight-Fourteen modulation circuit) 26, where they are converted into a format suitable for recording. The picture data thus obtained are delivered to the recording/reproduction section 27.

The disc recording/reproduction section 27 adds information relating to the respective picture data (picture processing information, printer control information, etc.) to the picture data of respective resolutions to record them onto the optical disc 28.

In a more practical sense, the optical disc 28 is, e.g., a magneto-optical disc having a diameter of 64 mm. The disc recording/reproduction section 27 carries out magneto-optical recording in a separate manner to record the picture data of low resolution at the inner circumferential side, to record the picture data of high resolution at the outer circumferential side, and to record the picture data of intermediate resolution into the intermediate area between the inner circumferential side and the outer circumferential side.

Figure 16:
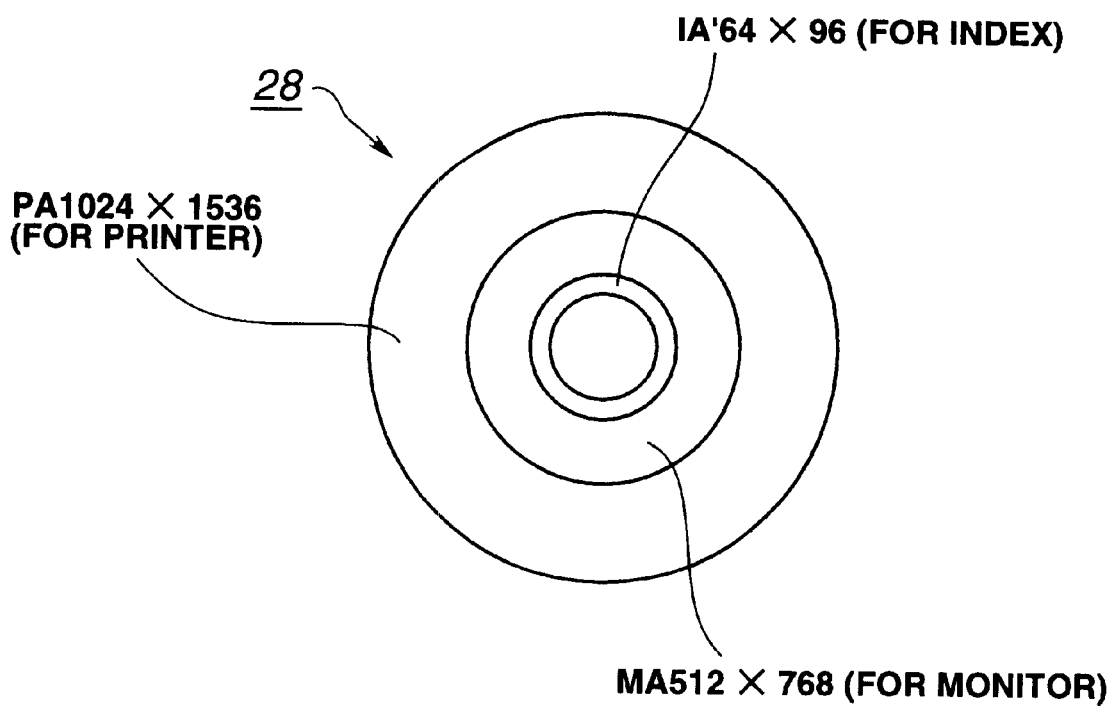
FIG. 16 is a plan view showing structure in model form of optical disc having recording areas tri-sected for respective resolutions by storage unit provided in the still picture recording/reproduction system.

The entire recording area of the optical disc 28 consists of, for example 2200 clusters, and the recording area is trisected as shown in FIG. 16, for example, so that the area corresponding to 14 clusters from the inner circumferential side towards the outer circumferential side is caused to be the recording area IA for the picture data of low resolution, the area corresponding to 200 clusters is caused to be the recording area MA for the picture data of intermediate resolution, and the area corresponding to 1800 clusters is the recording area PA for the picture data of high resolution.

Further, the system controller 20 controls switching of the selector 29 in accordance the with the resolution of picture data. Thus, the picture data of low resolution is recorded into the area corresponding to 1/15 clusters of the recording area IA, the picture data of high resolution is recorded into the area corresponding to 9 clusters of the recording area PA, and the picture data of intermediate resolution is recorded into the area corresponding to 1 cluster of the recording area MA.

Since these picture data are such that picture data of one frame is recorded in continuous areas on the disc, there is no necessity of moving the optical pick-up to carry out seek operation in the course of read-out operation of picture data of one frame. Thus, high speed read-out operation can be carried out.

This optical disc 28 is adapted so that, picture data of, for example 200 frames can be recorded thereon to. In addition, the picture data of 200 frames are caused to undergo management in the state divided into four albums in total, each consisting of picture data of 50 frames. Accordingly, in the case where user carries out recording of such picture data, he selects, by using the operation section 19, an album into which corresponding picture data is recorded. Thus, the system controller 20 controls the disc recording/reproduction section 27 so as to record picture data delivered to the album selected by the user in the order of taking-in.

It is to be noted that, in this instance, the picture data of low resolution is recorded as picture data for index for displaying If plural pictures recorded in the album within one picture on the screen, the picture data of intermediate resolution is recorded as picture data for display for displaying a desired one picture recorded in the album, and the picture data of high resolution is recorded as picture data for print.

In this embodiment, the storage units 18a, 18b are adapted to input key word and disc name for retrieving album names for every respective albums, picture names for every picture of respective albums, and the desired picture.

In this case, user allows the write key provided on the operation section 19 of the storage units 18a, 18b to undergo an ON operation. The system controller 20 is operative so that when the write key is caused to undergo the ON operation, it detects this the ON operation, resulting in the write mode where input of character information is carried out.

Then, the user operates the upper/lower key. The system controller 20 carries out display control of a display section 19a so as to display in succession characters of, for example, the album name, the picture name, the key word and the disc name every time the upper/lower key is operated once. The user observes the character displayed on the display section 19a to determine which information is inputted from now on to allow the EXEC key provided on the operation section 19 to undergo the ON operation. Thus, the system controller 20 recognizes information to be inputted from now on.

Then, the user operates the ten key provided on the operation section 19. Thus, the system controller 20 carries out the display control of the display section 19a so as to display character corresponding to the operation of the ten key. Then, the user allows the EXEC key to undergo the ON operation for a second time when the album name and so on, displayed on the display section 19a is in correspondence with the desired album name, and so on.

The system controller 20 is operative so that when the EXEC key is caused to undergo the ON operation for a second operation, it detects such ON operation to complete the write mode, and to control the disc recording/reproduction section 27 so as to record the inputted character information such as the album name and so on onto the optical disc 28 as the so-called ASCII code.

In a more practical sense, in the case of carrying out recording of the desired picture name, the user allows the write key to undergo the ON operation to allow the system controller 20 to be in the write mode, and to allow the upper/lower key to undergo the ON operation to select "picture name" which is information to be inputted from now on. Then, the user operates the ten key to input picture name of that picture. Thus, the system controller 20 forms ASCII codes corresponding to the inputted character to deliver them to the disc recording/reproduction section 27. Thus, the disc recording/reproduction section 27 records the ASCII codes corresponding to the picture name onto the optical disc 28.

It is to be noted that the number of characters which can be inputted as the picture name is, e.g., 16 characters and the number of characters which can be inputted as the album name is 32 characters, wherein such characters can be inputted by alphabet, katakana, kanji, and so on. Namely, inputting of 432 characters (16 characters×pictures of 25 frames+32 characters of alum name) can be inputted with one picture on screen.

The operation of the still picture recording/reproduction system in the case of reproducing picture data and character data (ASCII codes) recorded onto the optical disc 28 in this way to display them on the monitor unit 15 will now be described.

In this case, the user initially operates the album key provided on the operation section 19 of the storage units 18a, 18b. The system controller 20 is operative so that when the album key is caused to undergo the ON operation once, it detects such ON operation to control the disc recording/reproduction section 27 and the display section 19a so as to reproduce album name of that album to display it. Since four albums are recorded on the optical disc 28 as described above, every time the album key is caused to undergo the ON operation, four album names are displayed in succession on the display section 19a.

Then, the user selects a desired album from the four albums thereafter to allow the reproduction key to undergo, the ON operation. The system controller 20 is operative so that when the reproduction key is caused to undergo the ON operation, it detects such the ON operation to control the disc recording/reproduction section 27 so as to reproduce picture data of low resolution for index and ASCII codes (album name, picture name, etc.) of the selected album.

As described above, one album is constituted with picture data of 50 frames. Although those 50 picture frames are displayed on the display screen at a time, the display area of one frame is necessarily narrowed, resulting in the possibility that selection of desired picture by the user may become difficult. For this reason, the system controller 20 carries out the read-out control of the disc recording/reproduction section 27 so as to read out the picture data for low resolution of 25 frames by a single designation. Thus, the disc recording/reproduction section 27 first reads out, from the inner circumferential side of the disc, the picture data for low resolution of 25 frames, ASCII codes of the album name, and ASCII codes of respective picture names to deliver the picture data to a compression/expansion circuit 24 through the EFM circuit 26 and the selector 29, and delivers the ASCII codes to the buffer circuit 22 through the EFM circuit 26, the selector 29 and a non-compression circuit 25.

The compression/expansion circuit 24 implements expansion processing for low resolution to the picture data to deliver it to the raster/block converting circuit 23 and the buffer circuit 22.

The buffer circuit 22 temporarily stores the picture data and the ASCII codes.

When the picture data and the ASCII codes are stored into the buffer circuit 22, the DMA controller 2a carries out read-out control of the buffer circuit 22 so that the ASCII codes stored in the buffer circuit 22 are transferred at a high speed along with the picture data. Thus, the ASCII codes are transferred to the frame memory 1 at a high speed without intervention of the CPU 8 through the interface block 17 and the interface circuit 21 along with the picture data.

Figure 13:
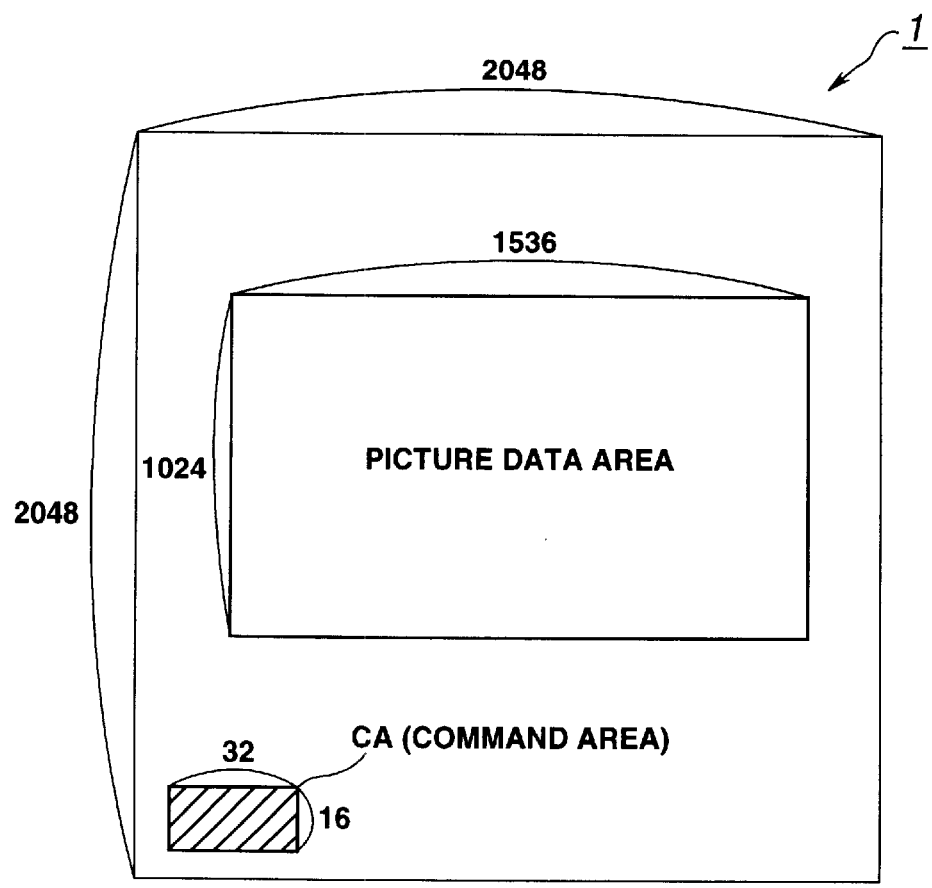
FIG. 13 is a view for explaining allocation of the memory area of the frame memory.

The memory area of the frame memory 1 is such that the dimensional (size) relationship of length and breadth is 2048 pixels×2048 pixels as a whole as shown in FIG. 13. Among the memory area, the memory area of 1024 pixels×1536 pixels (length×breadth) is the memory area for picture data (picture data area), and the memory area of 16 pixels×32 pixels (512 bytes) of the extra (remaining) area except for the area for picture data is command area CA which is the memory area for the ASCII code.

The memory controller 2 is operative so that when picture data and ASCII codes are transferred at a high speed from the buffer circuit 22, it carries out write-in control of the picture data into the picture data area of the frame memory 1, and carries out write-in control of the ASCII codes into the command area CA.

The operation of the still picture recording/reproduction system in the transfer control of such picture data and ASCII code and interpretation of the ASCII code will now be described.

The memory controller 2 discriminates whether data to be transferred at a high speed from now on is picture data or ASCII code.

The memory controller 2 is operative on the basis of the discrimination result so that in the case where data to be transferred is picture data, it instructs the DMA controller 2a to transfer the picture data, whereby the DMA controller 2a transfers at a high speed the picture data stored in the buffer circuit 22 to the frame memory 1. Thus, picture data of 1024 pixels×1536 pixels is written into the picture data area of the frame memory 1.

On the other hand, in the case where data to be transferred is ASCII code, the memory controller 2 instructs the DMA controller 2a to transfer the ASCII codes, whereby the DMA controller 2a transfers at a high speed the ASCII codes stored in the buffer circuit 22 to the command area CA of the frame memory 1. Thus, the ASCII codes are written into the command area of the frame memory 1.

Figure 14A:
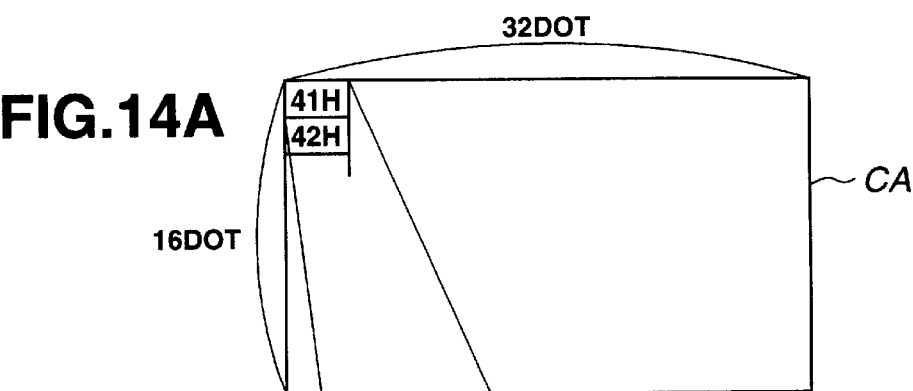
FIGS. 14A–14C are views for explaining interpretation of ASCII code transferred at a high speed as command data along with the picture data.

When the picture data and the ASCII codes are written into the A respective areas of the frame memory 1 in this manner, the memory controller 2 reads out corresponding ASCII code written in the command area CA as shown in FIG. 14(a) to carry out interpretation of that ASCII code.

Figure 14B:
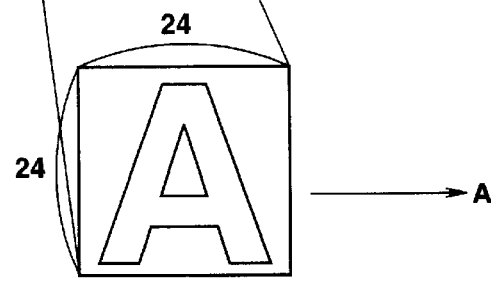

In a more practical sense, as shown in FIG. 14(b), for example, in the case where the ASCII code which has been read out from the command area is "41H", since this ASCII code indicates the character of "A" of alphabet, the memory controller 2 forms, picture data of the character of "A" of 24 pixels×24 pixels.

Figure 14C:
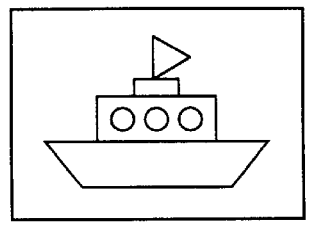

As described above, picture name of 16 characters can be recorded within respective pictures recorded on the optical disc 28. For this reason, the memory controller 2 conducts interpretation of the ASCII codes corresponding to 16 characters to carry out write-in control of the frame memory 1 so as to write picture data indicating the characters formed by converting the ASCII codes interpreted in this manner into characters into the portion corresponding to the bottom surface of each picture of the frame memory 1 as shown in FIG. 14(c).

When write-in operation of the picture data and the picture data indicating characters of the ASCII codes (hereinafter these two picture data are collectively referred to as picture data) into the frame memory 1 is completed in this manner, the memory controller 2 carries out read-out control of the picture data which have been written into the frame memory 1. Such picture data is converted into an analog picture signal through the D/A converter 14. The picture signal thus obtained is delivered to the monitor unit 15.

Figure 15:
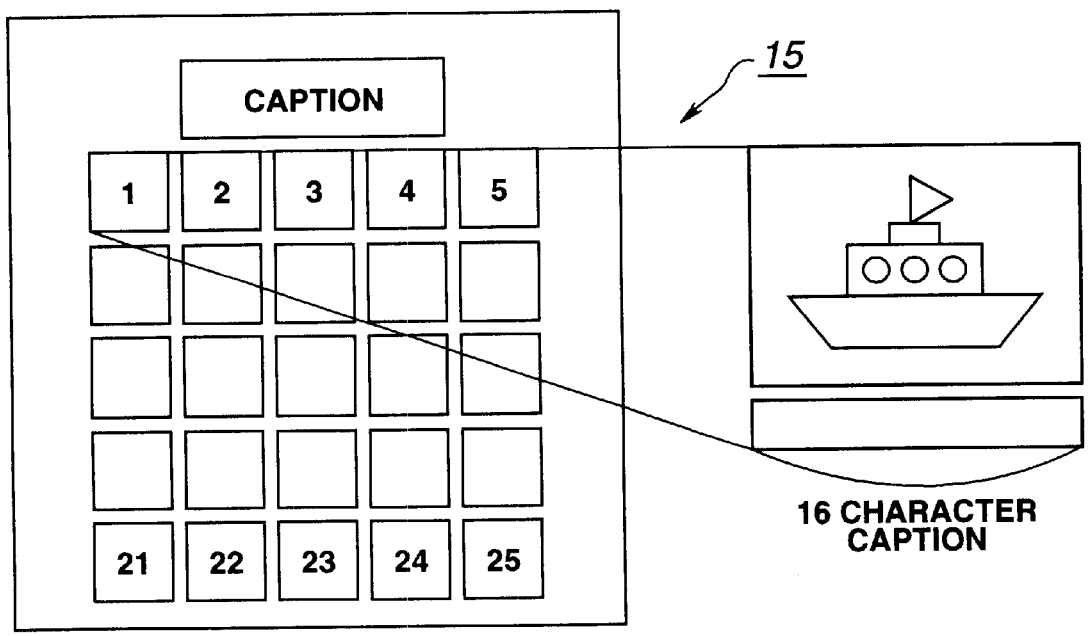
FIG. 15 is a view showing the state where the ASCII code is interpreted and picture image corresponding thereto is displayed on the display screen of monitor unit.

Thus, as shown in FIG. 15, pictures for index of 25 frames and picture names of respective pictures are displayed on the display screen of the monitor unit 15 along with the album name of the selected album.

Moreover, in the case where the user desires to display pictures of the remaining 25 frames of the selected album, the user operates the operation section 19 to designate display of the pictures of the remaining 25 frames. Thus, the system controller 20 controls the disc recording/reproduction section 27 so as to reproduce the picture data for low resolution of the remaining 25 frames and the ASCII codes of the respective picture data. Thus, the picture data for low resolution of the remaining 25 frames and the ASCII codes are transferred at a high speed as described above. As a result, picture images of the remaining 25 frames are displayed on the monitor unit 15.

In a manner as described above, an approach is employed to serially transfer the character data indicating the picture name and/or the album name, and so on as the ASCII code along with picture data, thereby making it possible to transfer, at one time, a large quantity of ASCII codes without increasing the number of wirings as in the case of parallel transfer. In addition, since the DMA controller 2a carries out transfer of the picture data and the ASCII codes without intervention of the CPU 8, such transfer can be carried out at a high speed. Thus, the data transfer time can be shortened.

Moreover, since the DMA controller 2a carries out high speed transfer as described above, there is no possibility that the CPU 8 is monopolized in the transfer of the picture data and the ASCII codes. For this reason, during transfer of the picture data and the ASCII codes, it is possible to use the CPU 8 for different data processing. In addition, low cost and ordinary processing speed CPU can be used as the CPU 8. Accordingly, low cost of the still picture recording/reproduction system can be realized through realization of low cost of the CPU 8.

As the result of the fact that the applicant of this invention trially manufactured the still picture recording/reproduction system to conduct experiments, picture data and ASCII codes could be transferred at a high speed in about 2 m sec., 130 sec at maximum, from the buffer circuit 22 of the storage units 18a, 18b to the frame memory 1. Thus, the processing from the transfer up to interpretation could be completed in about 34 m sec. in total (it takes 32 m sec. for interpretation of the ASCII code). Hitherto, it took more than 1 sec. in the processing from transfer to interpretation. Accordingly, the processing time scan be significantly improved.

Moreover, the reason why the time of about 32 m sec. is required for interpretation of the ASCII code is that the frame memory 1 and the CPU 8 are respectively independent structures. For this reason, as the result of the fact that the applicant of this invention conducted experiments using the configuration in which the frame memory 1 is placed on the memory map of the CPU 8, the time required for interpretation of the ASCII code can be reduced to 3 m sec. As a result, the time required from transfer up to interpretation can be reduced to 5 m sec. in total. Thus, further improvement could be made.

It is to be noted that while code transferred at a high speed along with the picture data is assumed to be the ASCII code, such code may be JIS code, or command data for designating control of respective components. Namely, in the case where command data is transferred from the storage units 18a, 18b to the CPU 8, command data is transferred at a high speed along with picture data to the frame memory 1, and is temporarily stored into the command area CA. Then, the CPU 8 reads out the command data from the command area CA to execute processing corresponding thereto.

In the case where command data is transferred from the CPU 8 to the storage units 18a, 18b in a manner opposite to the above, corresponding command data is transferred to the frame memory 1 along with picture data, and is temporarily stored into the command area CA. When the system controller 20 of the storage units 18a, 18b outputs a transfer request for command data, the memory controller 2 controls the DMA controller 2a in accordance with such transfer request. As a result, the command data stored in the command area CA is transferred at a high speed. The system controller 20 executes control corresponding to the command data which has been transferred at a high speed.

As stated above, this still picture recording/reproduction system can also carry out bi-directional high speed transfer of command data.

When pictures of 25 frames are displayed on the monitor unit 15 as picture for index, the user operates the operation section 19 so as to select a desired picture from these pictures.

The system controller 20 is operative so that when the operation section 19 is operated so that the desired picture is designated, it detects this operation to carry out read-out control of the disc recording/reproduction unit 27 so as to read out picture data of intermediate resolution corresponding to the selected picture. Thus, the disc recording/reproduction section 27 reads out picture data having intermediate resolution for display recorded in the intermediate area of the optical disc 28 to deliver it to the compression/expansion circuit 24 through the EFM circuit 26 and the selector 29.

The compression/expansion circuit 24 implements expansion processing for the intermediate resolution to deliver it to the interface block 17 through the raster/block converting circuit 23, the buffer circuit 22 and the interface circuit 21.

The system controller 20 is operative so that when the picture data for intermediate resolution is delivered to the interface block 17, it temporarily stores such picture data into the frame memory 1 to read out that picture data to deliver the picture data thus read out to the D/A converter 14. The D/A converter 14 converts the picture data for the intermediate resolution into picture data in analog form to thereby form a picture signal for the intermediate resolution to deliver it to the monitor unit 15. Thus, picture image selected by the user is displayed on the display screen of the monitor unit 15.

Further, the still picture recording/reproduction system selects a desired picture without displaying the picture for index, thus making it possible to display the desired picture on the monitor unit 15.

Namely, in the case where an album in which a desired picture is recorded and picture No. are known in advance, the user operates the ten key provided on the operation section 19 of the storage units 18a, 18b to designate the album and to designate the picture No.

Since pictures of 50 frames can be recorded within one album as described above, the user inputs a desired picture No. by the ten key to thereby select the desired picture. Then, the user selects the desired picture No. thereafter to allow the reproduction key to undergo the ON operation.

The system controller 20 is operative so that when it detects that the reproduction key has been caused to undergo the ON operation, it controls the disc recording/reproduction section 27 so as to read out the picture data of the designated picture No. of the album. Thus, the picture data of the designated picture No. is read out from the optical disc 28, and is delivered to the monitor unit 15, on which such picture data is displayed.

Moreover, such selection of the desired picture can be also carried out by using the retrieval key provided on the operation section 19. Namely, when the retrieval key is caused to undergo ON operation, the system controller 20 is placed in the retrieval mode. When the system controller 20 is brought into the retrieval mode, it carries out display control of the display section 19*a* so as to display in order characters of the picture name, the key word, the recording date and the recording time every time the upper/lower key is operated once. When the user selects information to be inputted from the picture name, the key word, the recording date and the recording time, he inputs, by using the ten key, the picture name, the key word, the recording date or the recording time of a picture to be retrieved to allow the EXEC key to undergo the ON operation.

Thus, the system controller 20 detects that the EXEC key has been caused to undergo the ON operation to start retrieval. Then, the system controller 20 retrieves picture corresponding to the picture name and the key word, and so on to carry out display control of the display section 19*a* so as to display, on the display section 19*a*, the album No., the album name, the picture name and the picture No., and so on of the retrieved picture. It is to be noted that in the case where plural pictures exist as the corresponding picture, the system controller 20 carries out display control of the display section 19*a* so as to display a list of these pictures.

Then, the user selects, by using the upper/lower key, a desired picture from the picture names, and so on displayed on the display section 19*a* to allow the reproduction key to undergo the ON operation.

The system controller 20 is operative so that when the reproduction key is caused to undergo the ON operation, it detects such ON operation to control the disc recording/reproduction section 27 so as to reproduce picture data of the selected picture.

Thus, the designated picture data is read out from the optical disc 28, and is delivered to the monitor unit 15, on which it is displayed.

The operation of the still picture recording/reproduction system in the case where the picture taken thereinto through the scanner unit 10 or the video input unit 11, or a picture recorded on the optical disc 28 is subjected to print will now be described.

Initially, in the case of carrying out a print operation of the picture taken into the system through the scanner unit 10 or the video input unit 11, the user operates the operation unit 13 to display, on the monitor unit 15, the picture which has been taken into the system through the scanner unit 10 or the video input unit 11 similarly to the above. In the case where the picture displayed on the monitor unit 15 is a desired picture, the user operates the operation unit 13 to designate print of that picture.

The picture data which has been taken in through the scanner unit 10 or the video input unit 11 is stored in the frame memory 1 of the picture processing block 12. For this reason, the CPU 8 is operative so that when the print is designated, it carries out read-out control of the frame memory 1 through the memory controller 2 so that the picture data stored in the frame memory 1 is read out. The picture data which has been read out from the frame memory 1 is delivered to a data converting circuit 16*a* of the printer section 16.

The data converting circuit 16*a* implements data conversion processing suitable for print to the picture data which has been read out from the frame memory 1. Namely, when the picture data is delivered in the form of R, G, B or Y, Cr, Cb, they are subjected to color coordinate conversion into the form of Y (yellow), M (magenta) and C (cyan) to thereby form picture data for print to deliver them to a thermal head 16*b*.

The thermal head 16*b* prints picture image corresponding to the picture data at about 300 DPI (Dots Per Inch) for example, on print paper 16*c* of A6 size. Thus, it is possible to print picture image corresponding to the picture data which has been taken in through the scanner unit 10 or the video input unit 11.

In the case where picture recorded on the optical disc 28 is subjected to print operation, the user displays pictures for index recorded on the optical disc 28 on the monitor unit 15 by the above-described operation. Then, the user selects a desired picture from the pictures for index. Thus, the selected picture is displayed on the monitor unit 15.

In the case where the picture image displayed on the monitor unit 15 is a desired picture, the user operates the operation unit 13 to designate print of that picture. Thus, the CPU 8 forms print control data which designates read-out operation of picture data for print of the picture image currently displayed on the monitor unit to output it. This print control data is delivered to the interface circuit 21 of the storage units 18*a*, 18*b* through the picture processing block 12 and the interface block 17, and is delivered to the system controller 20 through the interface circuit 21.

As described above, respective three kinds of picture data of picture data of low resolution for index, picture data of intermediate resolution for monitor display, and picture data of high resolution for print are stored (recorded) on the optical disc 28.

The system controller 20 is operative so that when the print control data is delivered, it controls the disc recording/reproduction section 27 so as to read out the picture data of high resolution for print designated by that print control data. Thus, the picture data of high resolution corresponding to the picture image displayed on the monitor unit 15 is read out from the optical disc 28. Since this picture data of high resolution is not caused to undergo compression processing in recording, this picture data is delivered to the buffer circuit 22 through the non-compression circuit 25, and is delivered to the data converting circuit 16*a* of the printer unit 16 through the interface circuit 21, the interface block 17 and the picture processing block 12.

The data converting circuit 16*a* implements data conversion processing suitable for print to the picture data of high resolution to deliver it to the thermal head 16*b*. Thus, picture image corresponding to the picture data which has been read out from the optical disc 28 is subjected to print operation.

This still picture recording/reproduction system implements, in the picture processing block 12, picture processing such as enlargement processing, contraction processing, rotation processing or dissolve processing, and so on to the picture data which has been taken in through the scanner unit 10 or the video input unit 11, thus permitting display on the monitor unit 15, recording onto the optical disc, or print at the printer unit 16. Similarly, this still picture recording/reproduction system reproduces picture data recorded on the optical disc 28 to implement the picture processing thereto, thus permitting display on the monitor unit 15, re-recording onto the optical disc 28 or print at the printer section 16.

Namely, as described above, picture data from the scanner unit 10, the video input unit 11 or the storage units 18a, 18b is delivered to the first bus selector 6 shown in FIG. 1.

The CPU 8 is operative so that when the user designates, by operating the operation unit 13, the device (the scanner unit 10, the video input unit 11 or the storage units 18a, 18b) into which picture data is taken, it detects such designation to carry out switching control of the first bus selector 6 so as to select input of the designated device. The picture data caused to be through the first bus selector 6 is delivered to the frame memory 1 through the operation circuit 4.

Figure 3A:
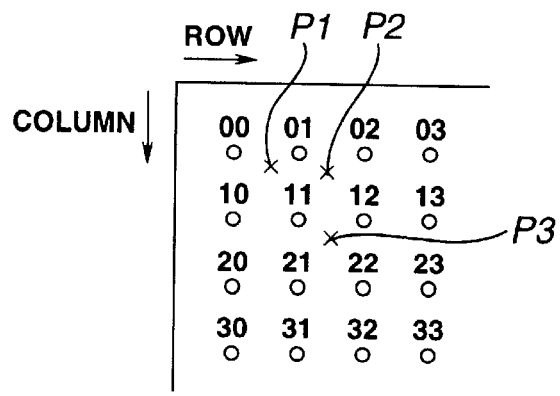
FIGS. 3A–3C are model views for explaining logical address and physical address of frame memory provided in the still picture recording/reproduction system.
Figure 3B:
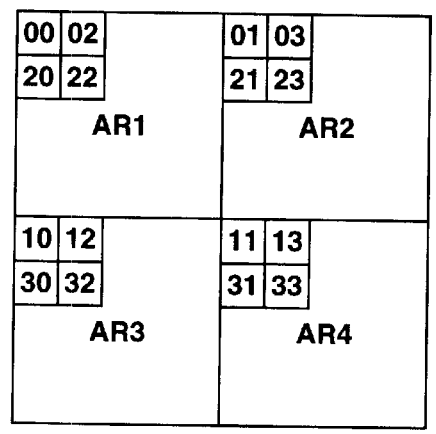

In a more practical sense, the frame memory 1 is divided into first through fourth memory areas AR1 to AR4 as the internal thereof is as shown in FIG. 3(b). The CPU 8 is operative so that when the picture data as indicated by o in FIG. 3(a), for example, is delivered to the frame memory 1, it carries out write-in control of that picture data through the memory controller 2 so that adjacent pixels are stored into the different memory areas as shown in FIG. 3(b). In FIG. 3(a), 00, 01, 02 . . . indicate addresses of pixels, wherein the first numeric value indicates lateral line (row) and the next numeric value indicates longitudinal line (column). Accordingly, "00" indicates address of pixel of the 0-the row and the 0-th column, "11" indicates pixel of the first row and the first column, and "12" indicates pixel of the first row and the second column.

In a more practical sense, with respect to the picture data delivered to the frame memory 1, as shown in FIG. 3(b), picture data of respective pixels of the addresses 00, 02, 20, 22 . . . are written into the first memory area AR1, and picture data of respective pixels of addresses 01, 03, 21, 23 . . . are written into the second memory area AR1. Moreover, picture data of the respective pixels of the addresses 10, 12, 30, 32 . . . are written into the third memory area AR3, and picture data of respective pixels of the addresses 11, 13, 31, 33 . . . are written into the fourth memory area AR4.

Figure 3C:
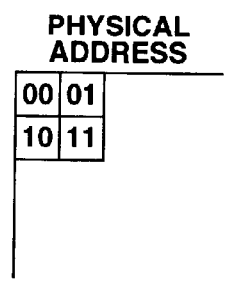

It is to be noted that although described later, picture data written into the respective memory areas AR1 to AR4 are independently read out from the respective memory areas AR1 to AR4, and the physical addresses of the respective memory areas AR1 to AR4 are respectively independent as shown in FIG. 3(c). For this reason, even if write-in control is conducted so that adjacent pixels are caused to be stored into different memory areas as described above, they are read out in the order from address 00 at every respective memory areas ARI to AR4 at the time of read-out operation.

When taking-in of desired picture data is carried out with respect to the frame memory 1 in this manner picture processing of the picture data can be made.

Initially, in the case of carrying out electric zooming to implement enlargement processing and contraction processing to the picture data, the user allows the plus key (+) or the minus key (−) provided on the operation unit 13 to undergo the ON operation. This electronic zooming is such that magnification is gradually increased or is gradually decreased in correspondence with the time period during which, e.g., the plus key or the minus key is caused to continuously undergo the ON operation. For this reason, the CPU 8, detects the time during which the plus key or the minus key has been caused to continuously undergo the ON operation to calculate enlargement magnification or contraction magnification of picture image on the basis of the time period during which the plus key or the minus key has been caused to continuously undergo the ON operation.

Figure 4:
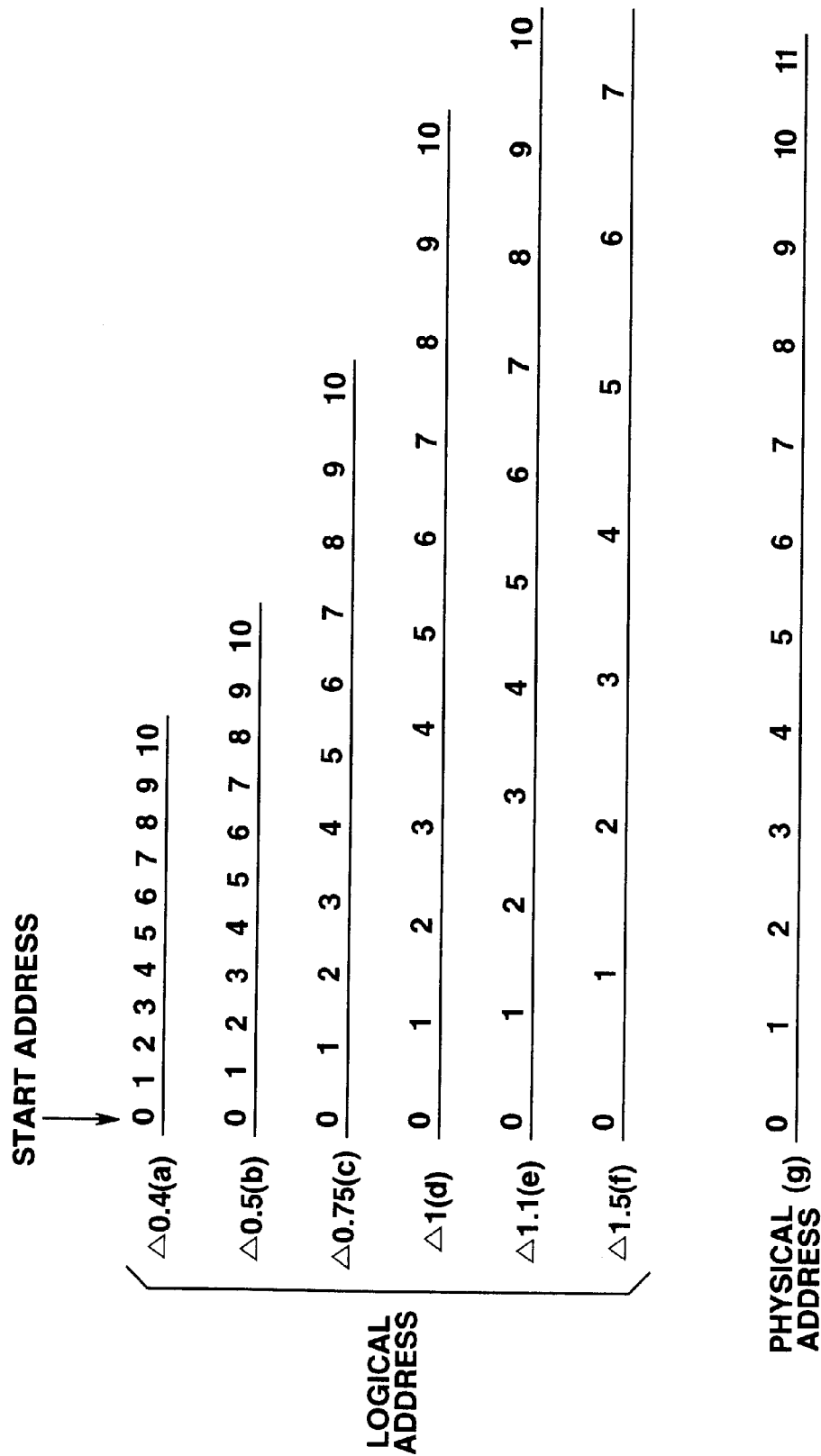
FIG. 4 is a view showing incremental value and decremental value corresponding to enlargement processing and contraction processing of a picture.

In a more practical sense, in the case where, e.g., enlargement processing of 1.1 times is designated ($\Delta 1.1$), the CPU 8 forms address data (delta address) indicating incremental value in the case where read-out address of $\Delta 1$ is expanded so as to take a value 1.1 times greater than the original value as shown in FIG. 4(e) with the read-out address of equi-multiple ($\Delta 1$) shown in FIG. 4(a) being as reference to deliver it to the address generating circuit 3 shown in FIG. 1 through the memory controller 2. Moreover, in the case where enlargement processing of 1.5 times is designated ($\Delta 1.5$), the CPU 8 similarly forms delta address which is incremental value in the case where the equi-multiple read-out address is expanded so as to take a value 1.5 times greater than the original value as shown in FIG. 4(f) to deliver it to the address generating circuit 3 shown in FIG. 1 through the memory controller 2.

On the other hand, the CPU 8 is operative so that in the case where contraction processing of 0.4 times is designated ($\Delta 0.4$), it forms delta address indicating decremental value in the case where the equi-multiple read-out address is contracted so as to take a value 0.4 times greater than the original value as shown in FIG. 4(a); in the case where contraction processing of 0.5 times is designated ($\Delta 0.5$), it forms delta address indicating decremental value in the case where the equip-multiple read-out address is contracted so as to take a value 0.5 times greater than the original value as shown in FIG. 4(b); and in the case where contraction processing of 0.75 times is designated ($\Delta 0.75$), it forms delta address indicating decremental value in the case where the equi-multiple read-out address is contracted so as to take a value 0.75 times greater than the original value as shown in FIG. 4(c), and deliver these delta addresses to the address generating circuit 3 shown in FIG. 1 through the memory controller 2.

The delta address indicates change of the physical address in the case of carrying out the enlargement processing or the contraction processing. Picture data which has been read out from a physical address as shown in FIG. 4(g) is caused to undergo data processing on the basis of the logical address to form picture data corresponding to the logical address.

Namely, the CPU 8 forms delta address in accordance with the enlargement magnification or the contraction magnification, and forms start address indicating read-out start address of the portion to be subjected to the enlargement processing or the contraction processing of the picture to deliver it to the address generating circuit 3 shown in FIG. 1 through the memory controller 2.

Figure 5:
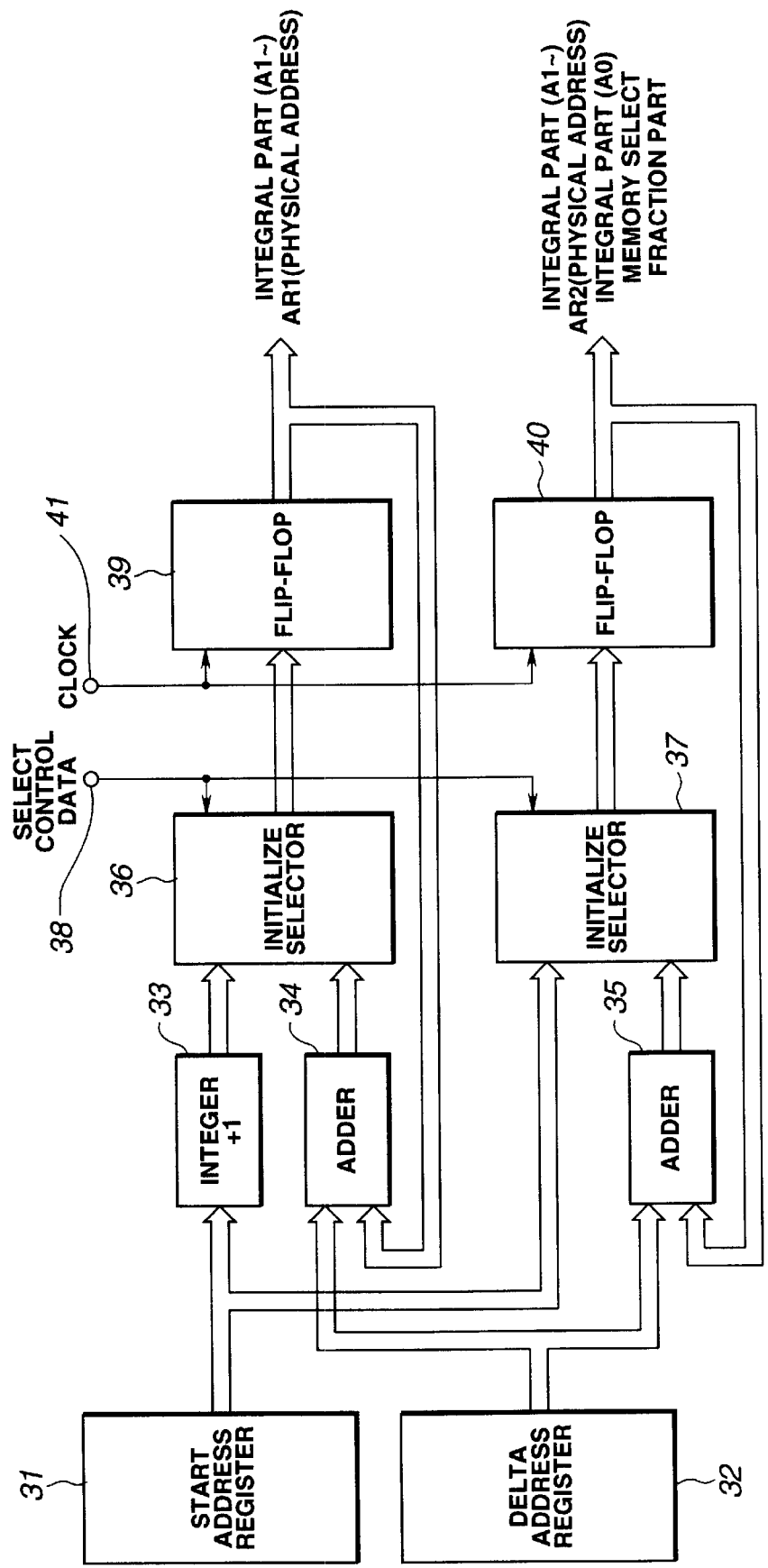
FIG. 5 is a block diagram showing the configuration of an address generating circuit provided in the picture processing block.

The read-out address formation section in lateral direction (row) for the memory areas AR1, AR2 of the address generating circuit 3 has a configuration as shown in FIG. 5. The start address delivered from the CPU 8, is temporarily stored into a start address register 31, and the delta address is temporarily stored into a delta address register 32.

In this example, the read-out address formation section in lateral direction (row) for the memory areas AR3, AR4 also has the same configuration as that of the read-out address in the lateral direction for the memory areas AR1, AR2. Moreover, the formation section for read-out address in a longitudinal direction (column) for the memory areas AR1, AR2 and the formation section for read-out address in the longitudinal direction (column) for the memory areas AR3, AR4, respectivelyl also have the same configuration as that of the formation section for read-out address in the lateral direction for the memory areas AR1, AR2.

The start address stored in the start address register 31 is delivered to an integer adding section 33, and is delivered to an initialize selector 37. Moreover, the delta address which has been delivered to the delta address register 32 is delivered to an adder 34 and an adder 35.

In this example, in carrying out the enlargement processing or the contraction processing, in the case where a remarked pixel P1 indicated by×in FIG. 3(a) is formed, four pixels adjacent to the remarked pixel P1 are used to determine by calculation that remarked pixel P1 in operation circuit 4 which will be described later. On the other hand, pixels adjacent to the remarked pixel P1 are respectively stored in different memory areas AR1 to AR4 of the frame memory 1. Moreover, in order to determine by calculation the remarked pixel in this manner, respective pixels which are read out from the respective memory areas AR1 to AR4 are required to have the relationship before and after in point of time for convenience of operation (calculation) in the operation circuit 4 which will be described later. For this reason, in the address generating circuit 3, a control is conducted such that read-out address corresponding to address forward in point of time is outputted at a timing earlier by predetermined number of address values.

Namely, the integer adding section 33 adds "1" to the start address to deliver it to the initialize selector 36. Thus, assuming now that, e.g., "0" is set as the start address, addresses A are delivered to the initialize selector 36 in the order of 1, 2, 3 . . . as shown in FIG. 6(a), and addresses are delivered to the initialize selector 37 in the order of 0, 1, 2 as shown in FIG. 6(b).

The respective initialize selectors 36, 37 are supplied with common select control data inverted at the timing where new address is delivered to the respective initialize selectors 36, 37 as shown in FIG. 6(c) through an input terminal 38.

The initialize selector 36 is operative so that only when select control data of high level is delivered thereto, it delivers the address to a flip-flop 39. Contrary to the above, the initialize selector 37 is operative so that only when select control data of low level is delivered, it delivers the address to a flip-flop 40.

The respective flip-flops 39, 40 are adapted to latch the address on the basis of a clock a delivered through an input terminal 41. More specifically, the flip-flop 39 outputs the latched address for a time period from the rising of the pulse to the next rising of the select control data (FIG. 6(c)) as shown in FIG. 6(d), and the flip-flop 40 outputs the latched address for a time period from the falling of the pulse to the next falling of the select control data as shown in FIG. 6(e). Thus, read-out address forward in point of time is outputted by a predetermined number of address values as shown in the FIGS. 6(d) and 6(e) mentioned above.

The address outputted from the flip-flop 39 is fed back to the adder 34, and the address outputted from the flip-flop 40 is fed back to the adder 35.

The adder 34 adds the address fed back from the flip-flop 39 to delta address indicating incremental value or decremental value set in accordance with the enlargement magnification or the contraction magnification to thereby form read-out address for the memory area AR1 corresponding to the enlargement magnification or the contraction magnification to output it through the initialize selection 36 and the flip-flop 39.

Similarly, the adder 35 adds the address fed back from the A flip-flop 40 to the delta address to thereby form the read-out address for the memory area AR2 corresponding to the enlargement magnification or the contraction magnification to output it through the initialize selector 37 and the flip-flop 40.

Accordingly, every time such operation is repeated, read-out addresses to which the delta address is added are successively outputted from the respective flip-flops 39, 40.

Figure 7:
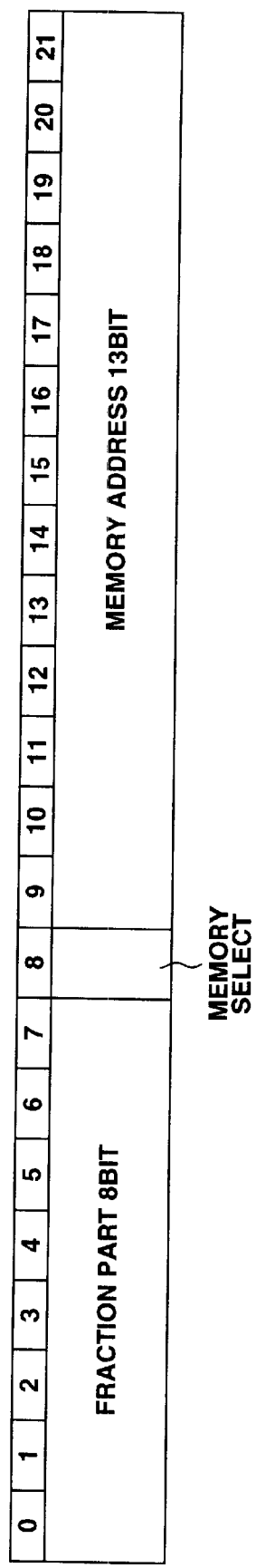
FIG. 7 is a view showing the format of the address data.

This read-out address is outputted as data of 22 bits in total as shown in FIG. 7, for example, wherein 8 bits in total of the 0-th bit to the seventh bit are fraction part data indicating incremental value or decremental value of address corresponding to the enlargement magnification or the contraction magnification, the eighth bit is memory select data for selecting the memory areas ARI to AR4, and 13 bits in total of the ninth bit to the 21-th bit are memory address indicating addresses of existing pixels.

It is to be noted that the fraction part data consists of horizontal direction coefficient (KH) indicating incremental value or decremental value in the horizontal direction with respect to corresponding address and vertical direction coefficient (KV) indicating incremental value or decremental value in the vertical direction with respect to the corresponding address.

As shown in FIG. 1, the memory address is delivered to the memory areas (AR1 to AR4) indicated by the memory select data, and the fraction part data (KH, KV) is delivered to the operation circuit 4.

For example, in FIG. 3(a), in order to determine by calculation the remarked pixel Pl, it is necessary to read out picture data of pixels of addresses 00, 01, 10, 11. The picture data of the pixels of these addresses 00, 01, 10, 11 are all stored at address 00 of the respective memory areas AR1 to AR4 as shown in FIG. 3(b).

For this reason, in this case, in the address generating circuit 3, the memory addresses of the address 00 are formed every the respective memory areas AR1 to AR4, and are delivered to the respective memory areas AR1 to AR4 of the frame memory 1.

Similarly, in order to determine by calculation remarked pixel P2 indicated by x, it is necessary to read out picture data of pixels of addresses 01, 02, 11, 12. As shown in FIG. 3(b), picture data of the pixel of the address 01 is stored at address 00 of the memory area AR2, picture data of the pixel of the address 02 is stored at address 01 of the memory area AR1, picture data of the pixel of the address 11 is stored at address 00 of the memory area AR4, and picture data of the pixel of the address 12 is stored at address 01 of the memory area AR3.

For this reason, in this case, in the address generating circuit 3, memory addresses of addresses 01, 00, 01, 00 for the respective memory areas AR1 to AR4 are formed, and are delivered to the respective memory area AR1 to AR4 of the frame memory 1.

Similarly, in order to determine by calculation remarked pixel P3 indicated by X in FIG. 3(a), it is necessary to read out picture data of pixels of addresses 11, 12, 21, 22. As shown in FIG. 3(b), picture data of pixel of the address 11 is stored at address 00 of the memory area AR4, picture data of pixel of the address 12 is stored at address 01 of the memory area AR3, picture data of pixel of the address 21 is stored at address 10 of the memory area AR2, and picture data of pixel of the address 22 is stored at address 11 of the memory area AR1.

For this reason, in this case, in the address generating circuit 3, memory addresses of addresses 11, 10, 01, 00 for the respective memory areas AR1 to AR4 are formed, and are delivered to the respective memory areas Rl to R4 of the frame memory 1.

When memory addresses are delivered to the frame memory 1 in this manner, picture data are read out from addresses designated by the memory addresses of the respective memory areas AR1 to AR4, and are delivered to the operation circuit 4.

Figure 8A:
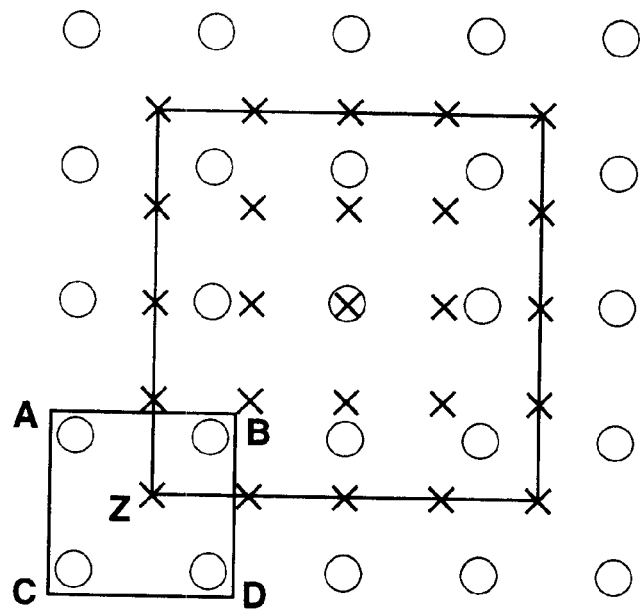
FIGS. 8A–8B are views for explaining arithmetic operation at the time of enlargement processing and at the time of contraction processing of an operation (computational) circuit provided in the picture processing block.

The operation circuit 4 determines by calculation picture data of picture consisting of respective pixels indicated by X in FIG. 8(a) on the basis of picture data of picture consisting of pixels indicated by o in FIG. 8(a), for example, and fraction part data (KH, KV) indicating incremental value or decremental value of address formed in accordance with the enlargement magnification or the contraction magnification.

Figure 8B:
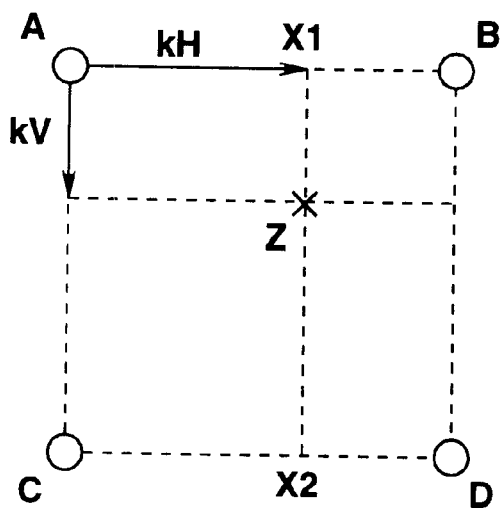

Namely, in the case of determining by calculation picture data of pixel of "Z" which is one of virtual pixels according to the enlargement processing or the contraction processing shown in FIG. 8(a), for example, the operation circuit 4 detects four pixels A to D around the pixel of "Z" as shown in FIG. 8(b). Then, the operation circuit 4 carries out interpolation between A pixel and B pixel on the basis of the horizontal direction coefficient (KH) indicating incremental value or decremental value of address in the horizontal direction to detect X1 pixel to carry out interpolation between C pixel and D pixel on the basis of the horizontal direction coefficient (KH) to detect X2 pixel, and to carry out interpolation between the X1 pixel and the X2 pixel on the basis of the vertical direction coefficient (KV) to determine by calculation picture data of the pixel of "Z".

Such operation processing is carried out on the basis of the following operational expressions (formulas).

$$X1 = A(1 - KH) + KHB \quad (1)$$
$$= A + KH(B - A)$$

$$X2 = C(1 - KH) + KHD \quad (2)$$
$$= C + KH(D - C)$$

$$Z = X1(1 - KV) + KVX2 \quad (3)$$
$$= X1 + KV(X2 - X1)$$

Figure 9:
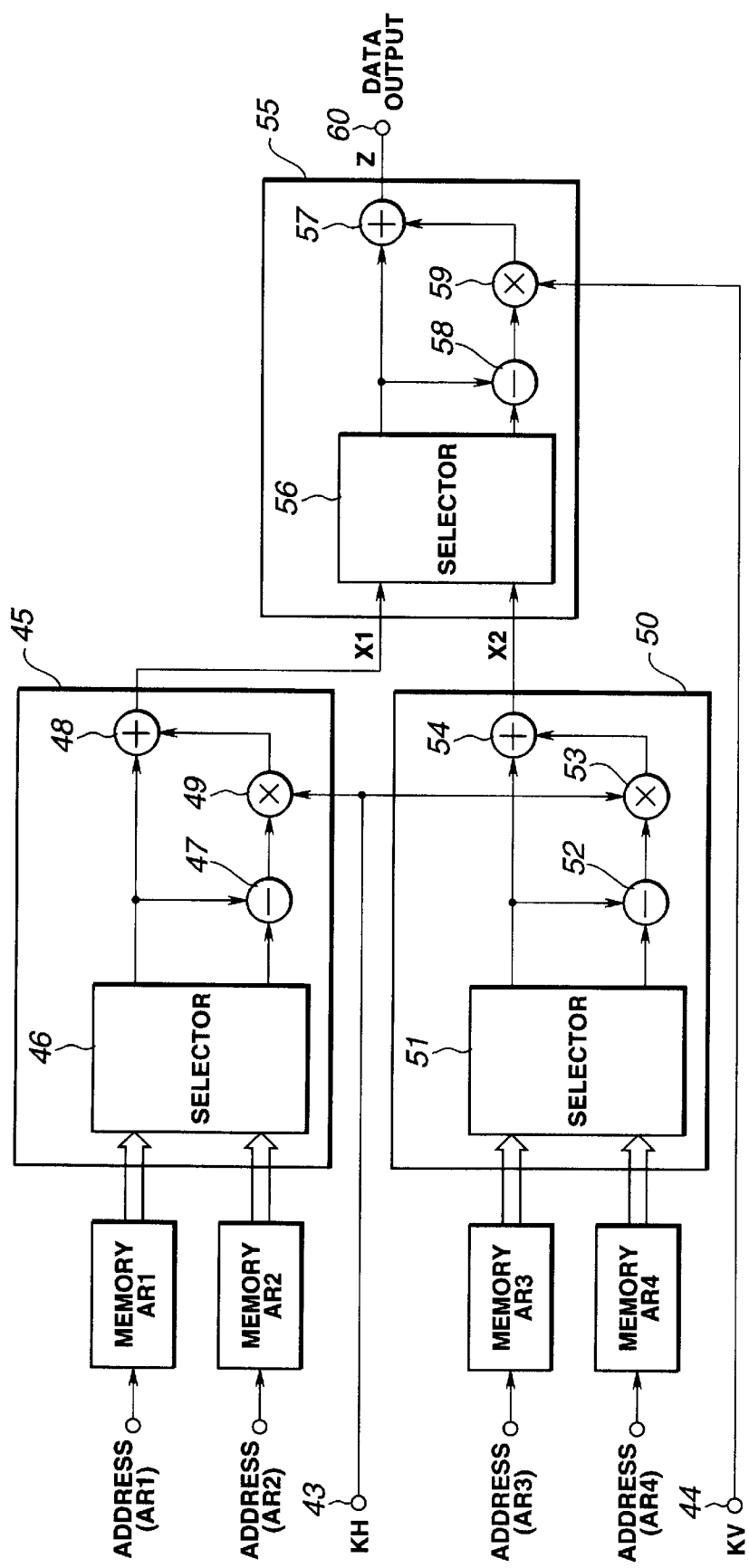
FIG. 9 is a block diagram showing the configuration of the operation circuit.

Accordingly, the operation circuit 4 is of a structure to carry out the above-described operation (computational) processing, and is composed, as shown in FIG. 9, a first operation section 45 for carrying out the operation of the first formula, a second operation section 50 for carrying out the operation of the second formula, and a third operation section 55 for carrying out the operation of the third formula.

These operation sections 45, 50, 55 respectively have the same configuration, and each include a selector, a subtracter, an adder and a multiplier.

In FIG. 9 mentioned above, when picture data of the A pixel and the B pixel are assumed to be respectively read out from the first memory area AR1 and the second memory area AR2 of the frame memory 1, the picture data of the A pixel and the B pixel are delivered to a selector 46 of the first operation section 45. The selector 46 delivers the picture data of the A pixel to an adder 48 and a subtracter 47. In addition, the picture data of the B pixel is delivered to the subtracter 47.

The subtracter 47 carries out a processing (B-A) to subtract the picture data of the A pixel from the picture data of the B pixel to deliver it to a multiplier 49. The multiplier 49 is supplied with the horizontal direction coefficient (KH) through an input terminal 43. The multiplier 49 carries out a processing (KH(B-A)) to multiply the subtraction data from the subtracter 47 by the horizontal direction coefficient (KH) to deliver it to the adder 48. The adder 48 carries out a processing (A+KH(B-A) . . . first formula) to add multiplication data from the multiplier 49 to picture data of the A pixel from the selector 46 to deliver it to a selector 56 of the third operation section 55 as picture data of the X1 pixel.

On the other hand, when picture data of the C pixel and the D pixel are assumed to be respectively read out from the third memory area AR3 and the fourth memory area AR4 of the frame memory 1, picture data of the C pixel and the D pixel are delivered to a selector 51 of the second operation section 50. The selector 51 delivers the picture data of the C pixel to an adder 54 and a subtracter 52. In addition, the selector 51 delivers the picture data of the D pixel to the subtracter 52.

The subtracter 52 carries out a processing (D–C) to subtract the picture data of the C pixel from the picture data of the D pixel to deliver it to a multiplier 53. The multiplier 53 is supplied with the horizontal direction coefficient (KH) through the input terminal 43. The multiplier 53 carries out a processing (KH(D–C)) to multiply the subtraction data from the subtracter 52 by the horizontal direction coefficient (KH) to deliver it to an adder 54. The adder 54 carries out a processing (C+KH(D–C) . . . formula (2)) to add the multiplication data from the multiplier 53 to the picture data of the C pixel from the selector 51 to deliver it to a selector 56 of the third operation section 53 as picture data of the X2 pixel.

The selector 56 of the third operation section 55 delivers the picture data of the X1 pixel to an adder 57 and a subtracter 58. In addition, the selector 56 delivers the picture data of the X2 pixel to the subtracter 58.

The subtracter 68 carries out a processing (X2–X1) to subtract the picture data of the X1 pixel from the picture data of the X2 pixel to deliver it to a multiplier 59. The multiplier 59 is supplied with the vertical direction coefficient (KV) through an input terminal 44. The multiplier 59 carries out a processing (KV(X2–X1)) to multiply the subtraction data from the subtracter 58 by the vertical direction coefficient (KV) to deliver it to the adder 57. The adder 57 carries out a processing (X1+KV(X2–X1) . . . second formula) to add multiplication data from the multiplier 59 to the picture data of the X1 pixel from the selector 56 to output it through an output terminal 60 as picture data of the Z pixel corresponding to the enlargement processing or the contraction processing.

The picture data formed after having undergone operation processing in this manner is delivered to the color adjustment (control) circuit 5 as picture data of 24 bits, for example.

The color adjustment circuit 5 is composed of, e.g., a matrix operation section, and a color palette section comprised of SRAM, and is operative to implement conversion processing of tone to picture data from the operation circuit 4 to deliver it to the second bus selector 7.

The second bus selector 7 is subjected to switching control by the CPU 8 in dependency upon device selected by the user. For this reason, for example, in the case where the monitor unit 15 is selected as the destination of the output of the picture data which has been caused to undergo enlargement processing or contraction processing, the CPU 8 carries out switching control of the second bus selector 7 so that the picture data is delivered to the monitor unit 15. Thus, it is possible to display, on the monitor unit 15, the picture which has been caused to undergo enlargement processing or contraction processing.

Moreover, in the case where the storage units 18a, 18b are selected by the user as destination of output of the picture data which has been caused to undergo enlargement processing or contraction processing, the CPU 8 carries out switching control of the second bus selector 7 so that the icture data is delivered to the storage units 18a, 18b. Thus, in the storage units 18a, 18b, it is possible to record picture data corresponding to the picture which has been caused to undergo enlargement processing or contraction processing.

Further, in the case where the printer unit 16 is selected by the user as the destination of the output of the picture data which has been caused to undergo enlargement processing or contraction processing, the CPU 8 carries out switching control of the second bus selector 7 so that the picture data is delivered to the printer unit 16. Thus, in the printer unit 16, it is possible to print, onto the print paper 16c, the picture which has been caused to undergo enlargement processing or contraction processing.

As stated above, this still picture recording/reproduction system divides the memory area of the single frame memory 1 into four memory areas AR1 to AR4 to carry out the write-in control so that adjacent pixels are stored into different memory areas. Further, an approach is employed to read out, from the respective memory area AR1 to AR4, four pixels adjacent to a pixel to be formed in accordance with enlargement magnification or contraction magnification to form pixel corresponding to the enlargement magnification or the contraction magnification on the basis of the four pixels thus read out and the incremental value or the decremental value of address by the enlargement magnification or the contraction magnification.

Namely, since the enlargement processing or the contraction processing is carried out on the basis of the picture data which has been read out from the frame memory 1, the original picture is preserved in the frame memory 1. For this reason, when the display etc. of the original picture image is designated, the original picture image can be immediately displayed.

A Moreover, since the picture data stored in the respective memory areas AR1 to AR4 of the frame memory 1 are read out at the same time from the respective memory areas AR1 to AR4 to implement picture processing thereto, real time processing at the video rate can be made although single and cheap memory of DRAM is used.

Further, since cheap DRAM can be used, realization of low cost of the still picture recording/reproduction system can be made.

It is to be noted that while the memory area of the frame memory 1 has been assumed to be divided into four sections, such memory area may be divided into an arbitrary number of sections, e.g., 9 sections or 16 sections, and so on. In this case, picture processing higher than that when the memory area is divided into four sections can be made, and interpolation accuracy can be improved by 9 point interpolation or 16 point interpolation.

The rotation processing for displaying picture image displayed on the monitor unit 15 in the state rotated by a predetermined angle will now be described.

In this case, as described above, the user operates the operation section 13 to display, on the monitor unit 15, the picture which has been taken in from the scanner unit 10, the video input unit 11 or the storage units 18a, 18b. Then, the user allows the rotation designation key provided on the operation section 13 to undergo the ON operation. The CPU 8 detects the number of the ON operations of the rotational designation key to carry out rewrite or read-out control of picture data stored in the frame memory 1 so as to carry out rotational display of picture displayed in order of 90 degrees, 180 degrees, 270 degrees and 360 degrees every time the rotational designation key is caused to undergo the the ON operation.

Figure 10:
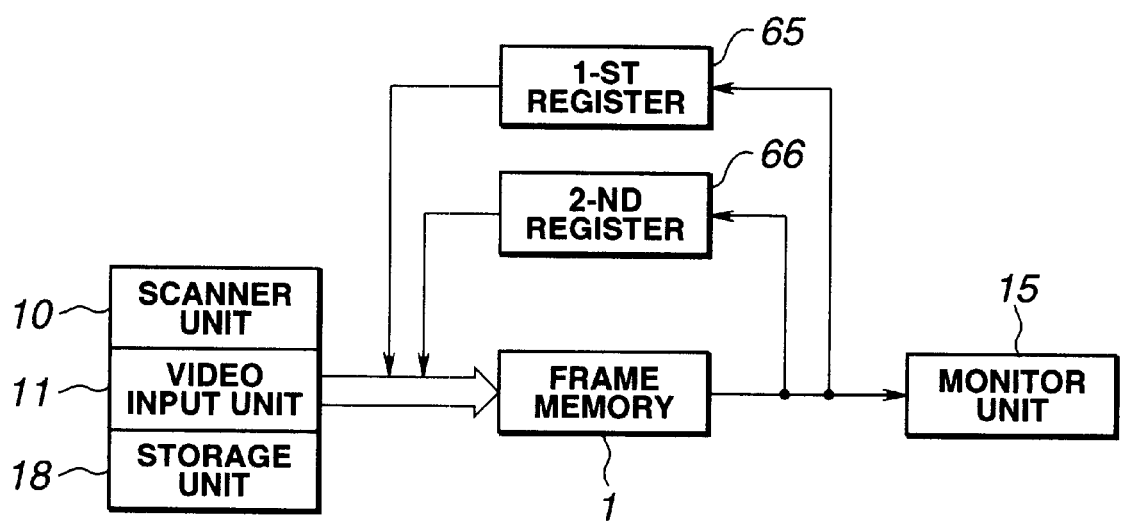
FIG. 10 is a block diagram showing the outline of the configuration of the still picture recording/reproduction system for explaining the operation at the time of rotation processing.

Namely, the picture processing block 12 includes first and second registers 65, 66 for temporarily storing the picture data which has been read out from the frame memory 1 as shown in FIG. 10. The CPU 8 is operative so that when it detects that the rotation designation key is caused to undergo the the ON operation once, it initially carries out such a rewrite control to exchange picture data stored in the frame memory 1 with the diagonal line being as the boundary as shown in FIG. 11(a).

Assuming now that the frame memory 1 has a memory area of N pixels×N pixels, the CPU 8 is operative so that in the case where rewrite control in which the diagonal line T is caused to be boundary is carried out, it increases the value of the row address counter from 1 to N−1 to decrease the value of the column address counter from N down to the value of the row address counter with respect to respective values of the row address counters.

Further, the CPU 8 carries out an operation to carry out, through first and second registers 65, 66, exchange between picture data in the frame memory 1 in which, with respect to values of respective addresses, the value of the row address counter is caused to be row address and the value of the column address counter is caused to be column address and picture data in the frame memory 1 in which the value of the column address counter is caused to be row address and the value of the row address counter is caused to be column address.

Figure 12:
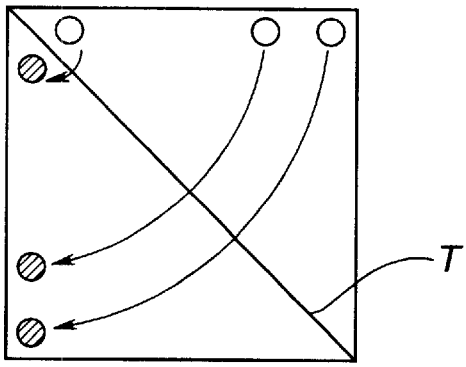
FIG. 12 is a model view for explaining the rewrite operation of the frame memory at the time of the rotation processing.

When such exchange operation is carried out, picture data stored in the frame memory 1 is rewritten with the diagonal line T being as the boundary as shown in FIG. 12. For this reason, a picture image as shown in the FIG. 11(a) mentioned above results in a picture image rotated by 270 degrees as shown in FIG. 11(b).

Then, the CPU 8 carries out re-write operation with the diagonal line T being the boundary as stated above thereafter to carry out read-out control of the frame memory 1 so as to carry out read-out operation of picture data in the opposite direction with respect to the ordinary read-out direction as shown in FIG. 11(b) to carry out re-write control of the frame memory 1 so as to rewrite the picture data in the order of implementation of the read-out operation in the opposite direction. Thus, picture data rotated by 90 degrees with respect to the original picture shown in FIG. 11(a) is stored into the frame memory 1 as shown in FIG. 11(c). Further, the CPU 8 reads out this picture data to deliver it to the monitor unit 15.

Thus, the picture image rotated by 90 degrees can be displayed on the monitor unit 15.

Moreover, the CPU 8 is operative so that it detects that the rotation designation key is caused to undergo the ON operation twice, it carries out the above-described re-write control with the diagonal line T being as the boundary with respect to the picture image shown in FIG. 11(c) to deliver the re-written picture data to the monitor unit 15. Thus, since a picture image as shown in the FIG. 11(c) mentioned above which is stored in the frame memory 1 is re-written with the diagonal line T being as the boundary, there results a picture image rotated by 180 degrees with respect to the original picture as shown in FIG. 11(d). Accordingly, it is possible to display the picture image rotated by 180 degrees on the monitor unit 15.

Further, the CPU 8 is operative so that when it detects that the rotation designation key is caused to undergo the ON operation three times, it carries out the above-described re-write control with the diagonal line T as the boundary with respect to the picture image shown in FIG. 11(d). Thus, a picture image rotated by 90 degrees with respect to the original picture as shown in FIG. 11(e) will be written into the frame memory 1. Further, the CPU 8 carries out such a re-write control thereafter to carry out read-out control of the frame memory 1 so as to read out picture data from a read-out direction opposite to the ordinary read-out direction to carry out re-write control of the frame memory 1 so as to re-write picture data in order of implementation of the read-out operation in the opposite direction. Thus, picture data rotated by 270 degrees with respect to the original picture shown in FIG. 11(a) is stored into the frame memory 1 as shown in FIG. 11(f). Further, the CPU 8 reads out this picture data to deliver it to the monitor unit 15.

Thus, picture image rotated by 270 degrees can be displayed on the monitor unit 15.

Further, when the CPU 8, detects that the rotation designation key is caused to undergo the ON operation four times, it carries out the above-described re-write control with the diagonal line T being as the boundary with respect to the picture image shown in FIG. 11(f). Thus, the picture data stored in the frame memory 1 is returned to the original picture data (which means that the picture A image is rotated by 360 degrees) as shown in FIG. 11(g). The CPU 8, reads out the picture data to deliver it to the monitor unit 15.

Thus, the picture image rotated by 360 degrees, i.e., the original picture image, can be displayed on the monitor unit 15.

In this still picture recording/reproduction system, in the case of carrying out such rotation processing, the above-described re-write control is carried out individually (independently) and, at the same time, with respect to respective four memory areas AR1 to AR4 of the frame memory 1.

In a more practical sense, re-write operation of picture data of the memory area AR1 is carried out within the memory area AR1 in a manner such that e.g., rewriting between logical address 02 and logical address 20 is carried out. Similarly, re-write operation of picture data of the memory area AR4 is carried out within the memory area AR4 in a manner such that, e.g., rewriting between logical address 13 and logical address 31 is carried out. On the contrary, as shown in FIG. 3(b), for example, picture data of the logical address 03 is stored in the memory area AR2 and picture data of the logical address 30 is stored in the memory area AR3. For this reason, rewriting of picture data of the memory area AR2 is carried out between picture data of the memory area AR2 and picture data of the memory area AR3.

For this reason, input bus and output bus of the registers provided in the memory area AR1 and the memory area AR4 are respectively connected to the same memory area AR1 and memory area AR4. On the. contrary, input bus and output bus of registers provided in the memory area AR2 and the memory area AR3 are respectively connected to memory buses of the opposites side.

Because of such a configuration, re-write operation of four picture data can be made at a time. Although cheap DRAM is used, high speed rotation processing can be made.

Moreover, this still picture recording/reproduction system is adapted to insert picture data delivered from the first storage unit 18a into an insertion pattern (hereinafter referred to as template) delivered from the second storage unit 18b, thus making it possible to carry out picture synthesis.

Figure 17:
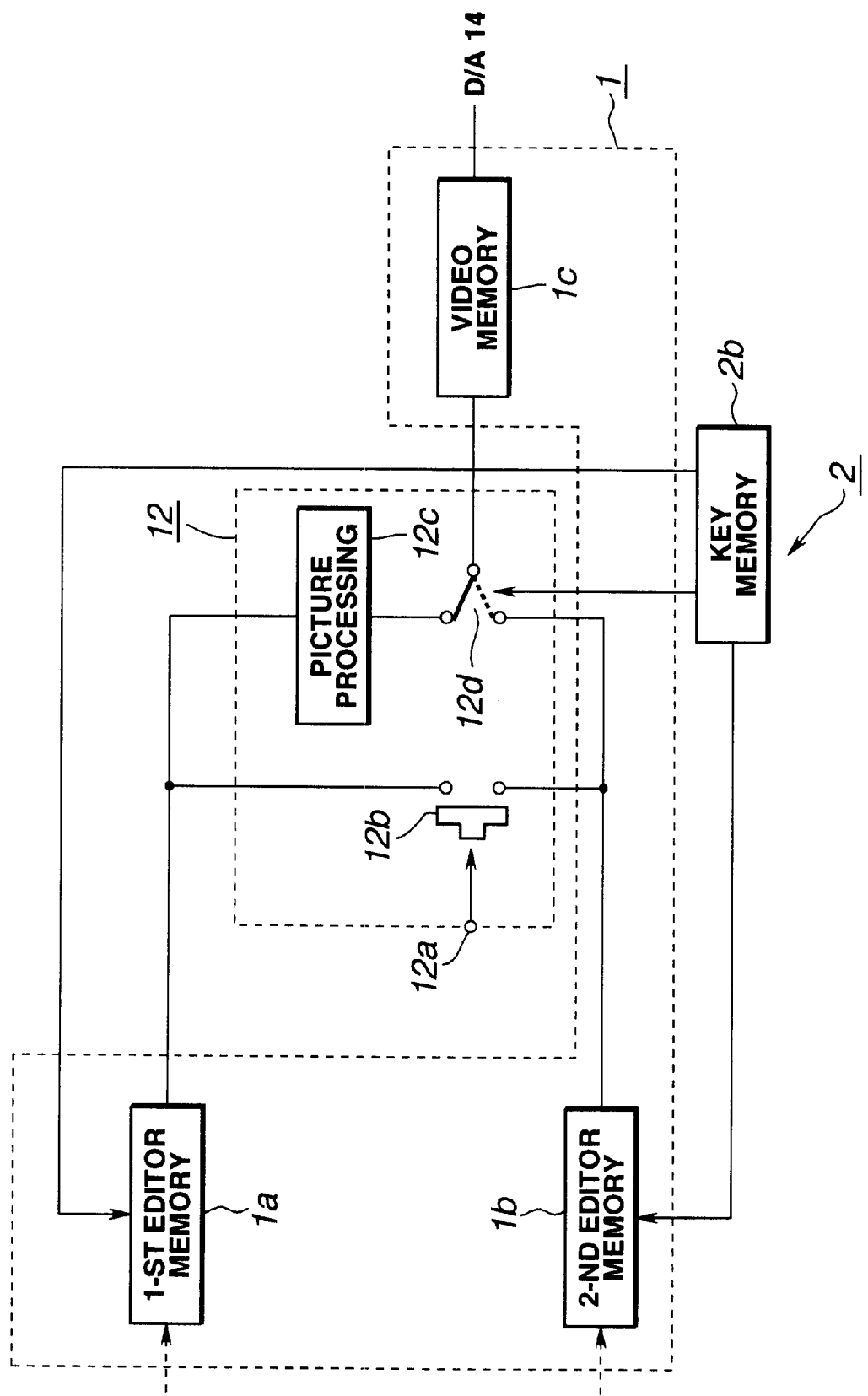
FIG. 17 is a block diagram equivalently showing the function in carrying out picture synthesis of the frame memory and the picture processing block provided in the still picture recording/reproduction system.

In this case, as shown in FIG. 17, the frame memory 1 comprises a first editor memory 1a in which picture data, is stored, a second editor memory 1b in which template, is stored, and a video memory 1c in which picture data caused to undergo picture display on the monitor unit 15 is stored. Moreover, the picture processing block 12 comprises a picture synthesis control section 12b supplied with control information from the memory controller 2 through an input terminal 12a, a picture processing section 12c supplied with picture data from the first editor memory 1a, and a switch 12d for carrying out switching between output of the picture processing section 12c and output of the second editor memory 1b, and the memory controller 2 comprises a key memory 2b in which there is stored key information indicating the position where picture data within the template is inserted.

This key information is delivered to the key memory 2b in accordance with selection of the user from the second storage unit 18b along with, for example, the template.

Figure 18A:
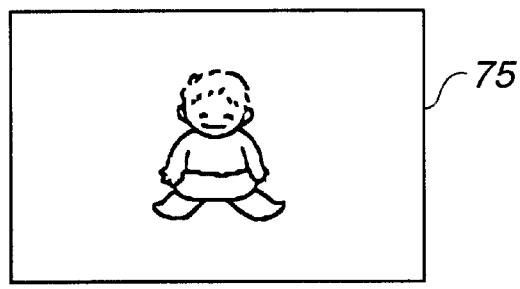
FIGS. 18A–18E are views for explaining the function of the picture synthesis.
Figure 18D:
Figure 18B:
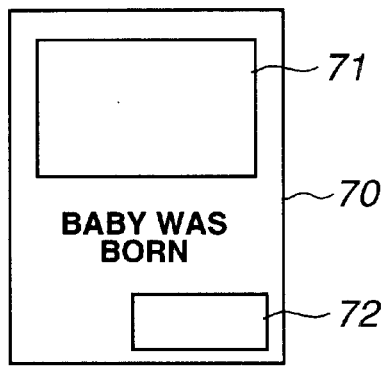
Figure 18E:
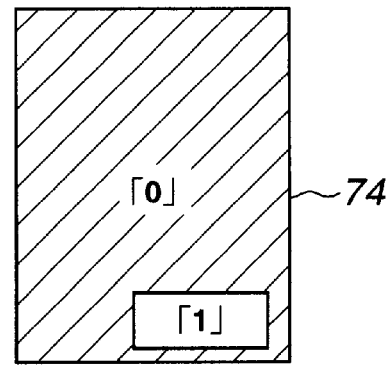
Figure 22:
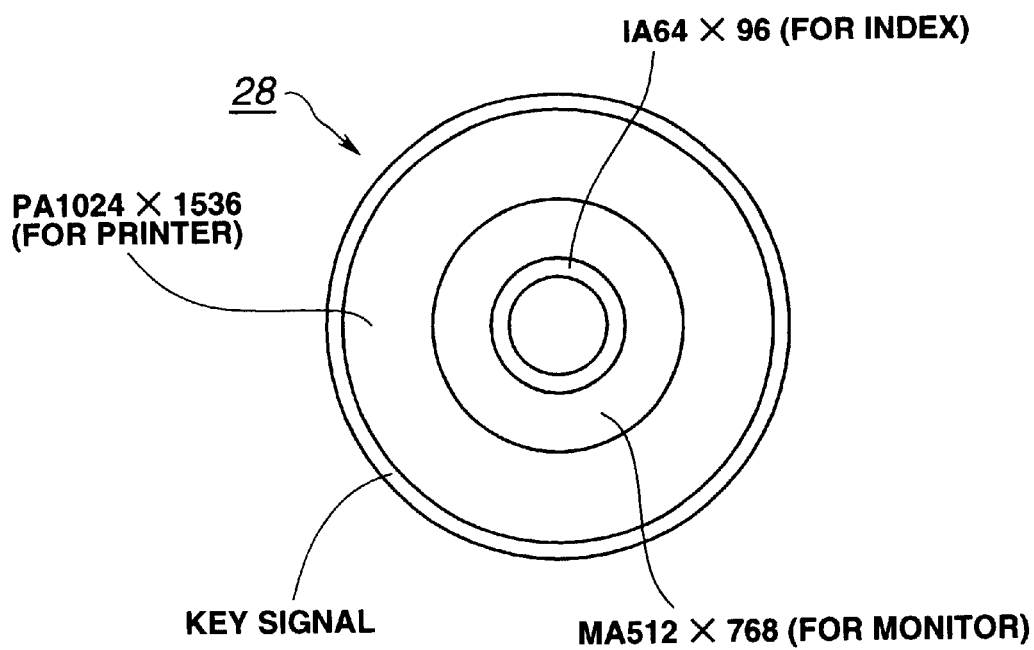
FIG. 22 is a view showing the recording form of the template and key information used in the picture synthesis.

The template includes, as shown in FIG. 18(b), for example, an area 70 having rectangular outer shape, a picture insertion area 71 for inserting picture data, and a character insertion area 72 for inserting character data, and is recorded on the optical disc 28 similarly to the picture data prior to picture synthesis. In this example, the optical disc 28 is an optical disc caused to undergo recording/reproduction by the second storage unit 18b. In this optical disc 28, as shown in FIG. 22, this template 70 is handled similarly to the picture data, wherein template picture data of low resolution for index is recorded into the recording area IA, template picture data of intermediate resolution for monitor display is recorded into the recording area MA, and template picture data of high resolution for print is recorded into the recording area PA.

Moreover, the area into which picture data is inserted which the template is designated as the picture insertion area 71 by key information stored in the above-described key memory 2b. Namely, by changing this key information, it is possible to change the picture insertion area 71 within the template.

Figure 19A:
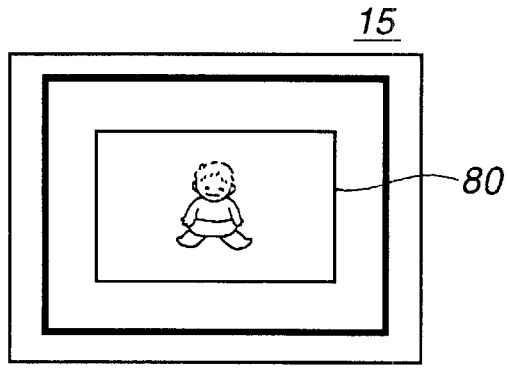
FIGS. 19A–19E are views showing picture displayed on a monitor unit in carrying out the picture synthesis.
Figure 19D:
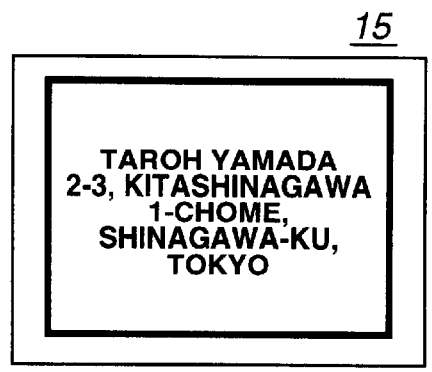

In this still picture recording/reproduction system, in carrying out picture synthesis, the user designates picture data and template. Namely, the user initially selects picture data as shown in FIG. 18(a) to be read out to instruct the first storage section 18a to read out the selected picture data. Thus, the first storage unit 18a reads out designated picture data of high resolution from the recording area PA of the optical disc 28 to deliver it to the first editor memory 1a. When the picture data is delivered to the first editor memory 1a, this picture data is also delivered to the video memory 1c through the picture processing section 12c and the switch 12d. As a result, a picture image 80 based on the picture data selected by the user is displayed on the monitor unit 15 as shown in FIG. 19(a), for example.

It is to be noted that the picture 80 delivered from the first editor memory 1a to the video memory 1c is caused to be picture data of low resolution caused to correspond to the monitor unit by thinning the picture data of high resolution stored in the first editor memory 1a.

Figure 19B:
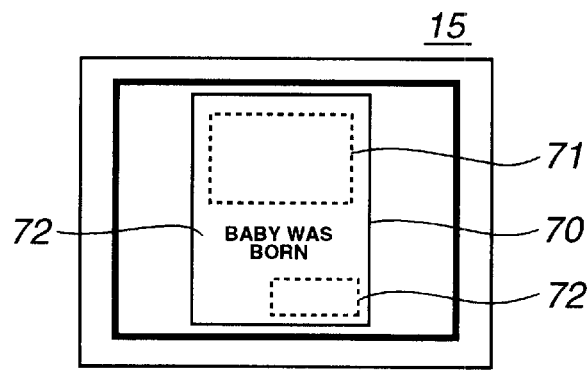
Figure 19E:
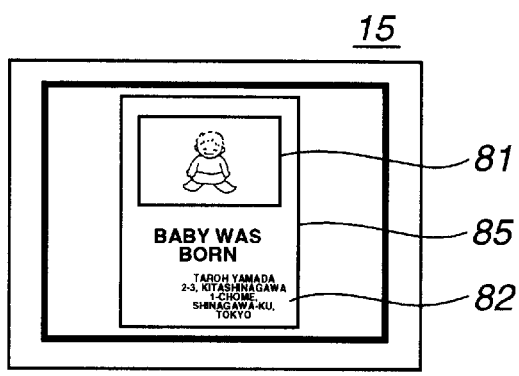

Then, the user selects a template as shown in FIG. 18(b) to be read out to instruct the second storage unit 18b to read out the selected template. Thus, the second storage unit 18b reads out the template picture data of high resolution corresponding to the designated template from the recording area PA to deliver it to the second editor memory 1b. When the template is delivered to the second editor memory 1b, this template is delivered to the video memory 1c through the picture processing section 12c and the switch 12d. Thus, picture image 70 of the template selected by the user is displayed on the monitor unit 15 as shown in FIG. 19(b).

It is to be noted that the picture 80 delivered from the second editor memory 1b to the video memory 1c is caused to be picture data of low resolution caused to correspond to the monitor unit by thinning picture data of high resolution stored in the second editor memory 1b.

Figure 18C:
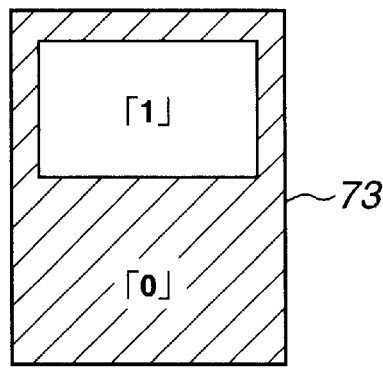

Then, a control is conducted so as to read out key information corresponding to the designated template 70 from the optical disc 28. It is to be noted that a memory area KA where key information is stored is provided in addition to the above-described recording areas IA, MA, PA as shown in FIG. 22, for example. The CPU 8 controls the second storage unit 18b so as to read out key information from the recording area KA. This key information includes area designation information for designating the area of picture data, and picture processing information for implementing a predetermined picture processing to picture data. In this example, the area designation information included in the key information corresponding to the template 70 is caused to be information as shown in FIG. 18(c). The area indicated by "1" in FIG. 18(c) indicates the area from which picture data corresponding to that area is extracted, and the area indicated by "0" to which slanting lines are attached indicates the area from which the picture data corresponding to that area is not extracted. In other words, the area corresponding to the "0" is adapted so that insertion pattern is extracted therefrom.

In the case of inserting the picture 75 shown in FIG. 18(a) into the picture insertion area 71, area designation information to designate such an area 73 as shown in FIG. 18(c) is delivered to the key memory 2b. The area designation information for designating the area 73 shown in FIG. 18(c) indicates information for extracting picture data corresponding to the picture insertion area 71. When the area designation information for designating the area 73 is delivered to the key memory 2b, the switch 12d carries out, in accordance with the area designation information stored in the key memory 2b, switching between picture information stored in the first editor memory 1a and the template stored in the second editor memory 1b to deliver the information obtained by switching to the video memory 1c.

Figure 19C:
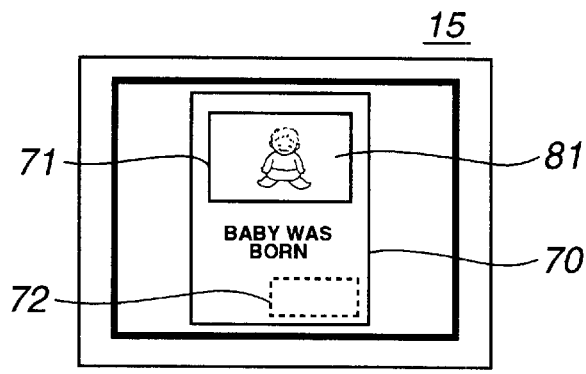

Thus, picture data where picture data is inserted into the picture insertion area 71 designated by key information within the template is stored into the video memory 1c. Thus, picture image synthesized as the result of the fact that picture data 81 is inserted into the picture insertion area 71 within the template 70 selected by the user is displayed on the monitor unit 15 as shown in FIG. 19(c).

In this case, picture data delivered to the video memory 1c is such that resolution is lowered by the picture processing section 12c so that there results a resolution sufficient to be displayed on the display screen of the monitor unit 15, thus to reduce the data quantity. For this reason, data transfer with respect to the video memory 1c from the first and second editor memories 1a, 1b can be carried out at a high speed.

The user looks at picture displayed on the monitor unit 15 to thereby confirm the synthesized picture image, and carries out designation of zooming or trimming, and so on. When zooming or trimming, is designated, the picture processing section 12c changes read-out address of the picture data stored in the first editor memory 1a. Thus, the picture data in which processing such as zooming or trimming, has been carried out is delivered to the video memory 1c.

In a more practical sense, the memory controller 2 carries out the control of read-out operation of picture data based on the read-out address varied by the picture processing section 12c as described above.

Moreover, when new key information is selected by the user in this state, the newly selected key information is delivered to the key memory 2b, and the switch 12d carries out, in accordance with the area designation information of the newly set key information, switching between the picture information stored in the first editor memory 1a and the template stored in the second editor memory 1b to deliver the information obtained by such switching to the video memory 1. Thus, synthetic picture image in which picture data is inserted into the picture insertion area corresponding to the changed key information is displayed on the monitor unit 15. The user can prepare various synthetic picture images in which picture data is inserted into the picture insertion area corresponding to the changed key information by only changing key information and confirm them. Thus, working efficiency can be improved.

When ultimate confirmation is carried out by the user, control information is delivered to a picture synthesis control section 12b through the input terminal 12a from the memory controller 2. When the control information is delivered, the picture synthesis control section 12b inserts the picture data stored in the first editor memory 1a into the picture information area on the template designated in accordance with the area designation information of the key information to form picture data of synthetic picture (hereinafter simply referred to as synthetic picture) to deliver the synthetic picture thus formed to, e.g., the second editor memory 1b.

In a more practical sense, at this time, the memory controller 2 generates, in accordance with the area designation information of the key information stored in the key memory 2b by control from the picture synthesis control section 12b, a read-out address of the first editor memory 1a and a write-in address of the second editor memory 1b to carry out a control so that the picture data which has been read out from the first editor memory 1a is delivered to the second editor memory 1b. Thus, the picture data which has been read out from the first editor memory 1a in accordance with the read-out address is inserted into the picture insertion area designated by the write-in address of the template of the second editor memory 1b. As a result, a synthetic picture is formed.

The synthetic picture stored in the editor memory 1b is delivered to the first storage unit 18a by instruction from the user. The synthetic picture thus provided is recorded on the optical disc 28, or is delivered to the printer unit 16 so that it is subjected to print onto the print paper 16c.

In this example, since the picture data stored in the first editor memory 1a and the template stored in the second editor memory 1b have resolution sufficient for print (printing) operation, the resolution of the synthetic picture delivered to the editor memory 1b is set to a high value.

Namely, in this still picture recording/reproduction system, in carrying out picture synthesis, when confirmation of synthetic picture is carried out, picture data of which resolution has been reduced is used to form a picture image to be displayed on the monitor unit 15 to thereby allow the select operation of template and/or key information or the processing such as zooming and/or trimming, and so on to be carried out at a high speed, thus making it possible to improve the operability. In addition, in this still picture recording/reproduction system, it is possible to form picture data to be outputted by using picture data of high resolution after setting of synthetic picture is established. Thus, synthetic picture of good (high) picture quality can be obtained.

In the case where an attempt is made to further synthesize character information, and so on with the synthetic picture thus prepared, the user prepares in advance character information to be synthesized to store (record) the character information thus prepared as character code such as ASCII code or JIS to code. Further, as described above, picture data and the template are synthesized thereafter to designate the character information stored (recorded) on the optical disc 28.

When the character information is designated, character codes constituting character information are transferred from the second storage unit 18*b* to the frame memory 1. In this case, the memory controller 2 reads out character code stored in the frame memory 1 as described above to form picture data of picture image 76 shown in FIG. 18(*d*) corresponding to the character codes thus read out to deliver the picture data thus formed to, e.g., the first editor memory 1*a*.

When the picture data corresponding to the character codes is delivered to the first editor memory 1*a*, this picture data is delivered to the video memory 1*c* through the picture processing section 12*c* and the switch 12*d*. As a result, picture image 82 is displayed on the basis of the picture data of the video memory 1*c*, as shown in FIG. 19(*d*), for example, on the monitor unit 15. When the picture image 82 of characters corresponding to the character codes is displayed on the monitor unit in this manner, user looks at the picture image 82 of character thus displayed, thereby making it possible to confirm the selected character information. When the user has confirmed the character information, he gives an instruction to synthesize character information with the synthetic picture.

On the other hand, the insertion pattern which has been subjected to picture synthesis shown in FIG. 18(*c*) prepared by the above-described picture synthesis is stored in the second editor memory 1*b*. When synthesis of character information is instructed by the user in this state, the CPU 8 delivers area designation information for designating an area 74 as shown in FIG. 18(*e*) to the key memory 2*b*. This area designation information is information for extracting character data corresponding to the character insertion area 72. Then, the switch which makes designation of the area 74 in the key memory 2*b* carries out, in accordance with the area designation information stored in the key memory 2*b*, switching between character information (FIG. 18(*d*)) stored in the first editor memory 1*a* and insertion pattern (FIG. 18(*c*)), which has been subjected to picture synthesis, stored in the second editor memory 1*b* to deliver the information obtained by switching to the video memory 1*c*.

Thus, picture data in which character information 82 is inserted in the character insertion area 72 is stored into the video memory 1*c*, and a synthetic picture image as shown in FIG. 19(*e*) is displayed on the monitor unit 15. Thus, the user can confirm the synthetic picture ultimately prepared.

Moreover, data which can be synthesized with respect to the prepared synthetic picture is not limited to character information as described above, but new picture data may be read out into the first editor memory 1*a* in the state where synthetic picture is stored in the second editor memory 1*b* to set key information at the key memory 2*b*, thereby making it possible to further synthesize picture data with respect to the synthetic picture.

Figure 20A:
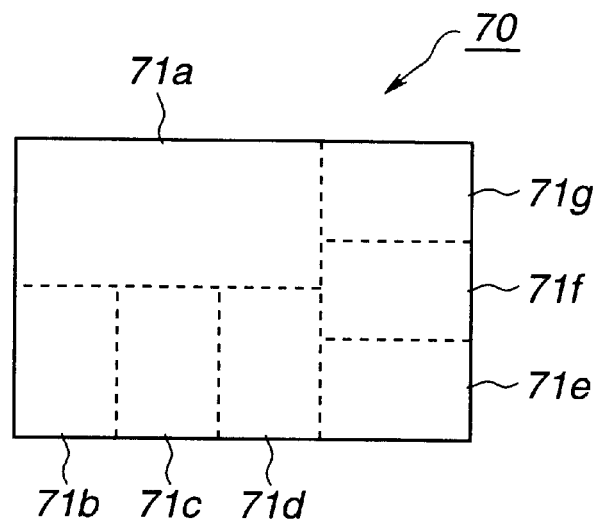
FIGS. 20A–20C are views showing a template used in the picture synthesis.
Figure 20B:
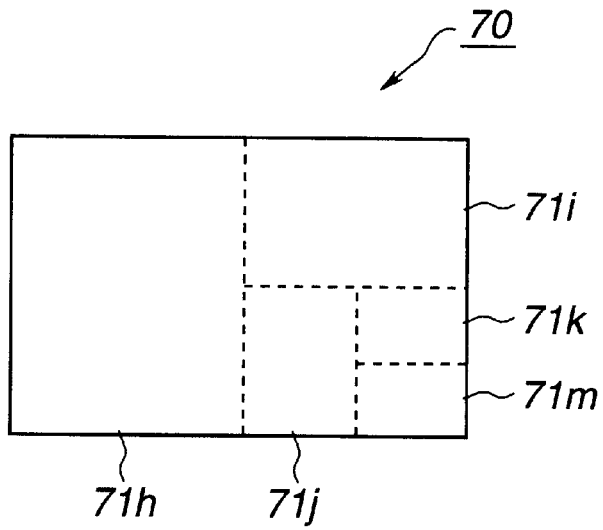
Figure 20C:
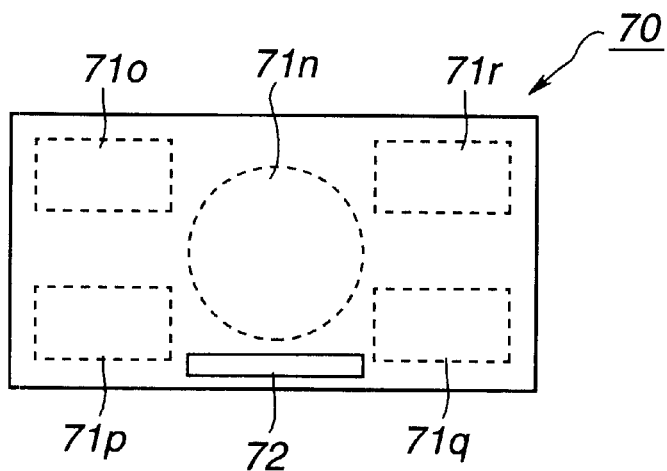

In this case, when, template 70 comprised of only outer frame as shown in FIG. 20(*a*), for example, is used to designate plural picture insertion areas 71*a*, 71*b*, 71*c*, 71*d*, 71*e*, 71*f*, 71*g* by plural key information on such template 70, it is possible to prepare, e.g., a synthetic picture in which collective photograph of all persons joined of excursion or wedding ceremony, and so on, is inserted in the picture insertion area 71*a* and photographs of individual persons, are inserted in succession in picture insertion areas 71*b* to 71*g*.

Figure 21:
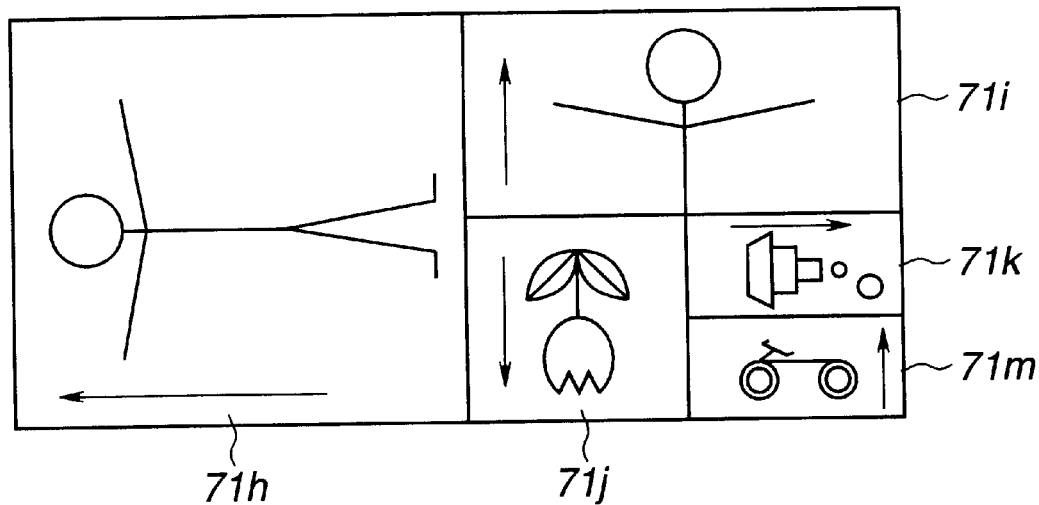
FIG. 21 is a view showing an example of a synthetic picture prepared in the picture synthesis.

Moreover, in the case where template 70 comprised of only outer frame as shown in FIG. 20(*b*), for example, is used, designation of plural picture insertion areas 71*h*, 71*i*, 71*j*, 71*k*, 71*m* may be made by plural key information to insert in succession picture data rotated by zooming, trimming or rotation processing as described above into respective picture insertion areas 71*h* to 71*m* in conformity with shapes of the respective picture insertion areas 71*h* to 71*m* as shown in FIG. 21, for example, thus making it possible to prepare a synthetic picture. In FIG. 21, the arrows indicate the direction of the picture data.

Further, the shape of the picture insertion area which can be designated by key information is not limited to the above-described rectangle, but a circular picture insertion area 71*n* can be designated as shown in FIG. 20(*c*), for example. In such a case, picture data is trimmed so as to take circular shape in conformity with the shape of the picture insertion area 71*n* to make synthesis. If template 70 of such a shape is used, it is possible to prepare, e.g., a synthetic picture in which picture data, of the user himself is inserted in the circular picture insertion area 71*n* and picture data, of family is inserted in picture insertion areas 71*o*, 71*p*, 71*q*, 71*r* around the picture insertion area 71*n*.

It is to be noted that while explanation has been given in the above-described embodiment in connection with the case where template prepared so as to include character information in advance is used, picture data corresponding to character code which has been designated from the user or has been read out from the second storage unit 18*b* may be inserted into a template including no character information thereafter to use it as template.

Thus, it is possible to use the same template for different purposes in a manner to allow plural character information to correspond thereto. As a result, high efficiency of the work can be realized by effectively utilizing the template.

Explanation will now be given in a more practical sense in connection with the key information. This key information includes area designation information as information for designating the area of picture data as described above. Namely, the area of picture data may be designated by the area designation information to insert the designated area into the picture insertion area 71 of the template. Further, this key information includes picture processing information for designating picture processing with respect to key information. When the CPU 8 receives picture processing information for designating picture processing included in the key information, it implements picture processing based on the picture processing information to picture data.

The picture processing information includes, e.g., rotation data for controlling rotation of picture data. When the CPU 8 receives rotation data included in the picture processing information, it implements rotation processing based on the rotation data to picture data. Moreover, the picture processing information includes enlargement/contraction data for controlling enlargement/contraction of picture data. When the CPU 8 receives enlargement/contraction data included in the picture processing information, it implements enlargement/contraction processing based on the enlargement/contraction data to picture data. Further, the picture processing information includes direction data for controlling direction of picture data. When the CPU 8, receives direction data included in the picture processing information, it implements rotation processing to picture data so that the direction that the direction data indicates and the direction that picture data has are in correspondence with each other. In addition, the picture processing information includes shape data indicating what size the area extracted by the area designation information of the key information has. When the CPU 8 receives shape data included in the picture processing information, it implements enlargement/contraction processing to picture data so as to be in correspondence with the size that the shape data indicates.

The operation in the case where such key information has the area designation information and the picture processing information will now be described with reference to FIGS. 20(*b*) and 21.

Namely, when, e.g., read-out operation of a template 70 as shown in FIG. 20(*b*) is instructed from the user, picture data of the template which has been read out from the optical disc 28 is delivered from the second storage unit 18*b* to the second editor memory 1*b* through the I/F block 17. At this time, key information corresponding to respective picture insertion areas 71*h* to 71*m* of the template 70 are read out from, e.g., the memory area KA of the optical disc 28, and are delivered to the key memory 2*b*.

Accordingly, key information having the picture designation area information and the picture processing information is stored into the key memory 2*b*.

Further, the picture data of the template which has been read out into the second editor memory 1*b* is delivered to the video memory 1*c* through the switch 12*d*. Thus, picture image of the template is displayed on the display screen of the monitor unit 15 on the basis of the content of the video memory 1*c*.

When the picture data inserted into the respective picture insertion areas 71*h* to 71*m* is designated from the user, the picture data which has been read out from the optical disc 28 is delivered to the first editor memory 1*a*. Then, the picture processing block 12 reads out, from the key memory 1*b*, key information corresponding to the picture insertion area into which the picture data is inserted to implement, in accordance with the picture processing information included in the key information, processing such as zooming, trimming and/or rotation, and so on to the picture data which has been read out into the first editor memory 1*a*. These processing are set in advance by key information corresponding to respective picture insertion areas. For this reason, even in the case where corresponding data is different in size and/or shape, etc. of the picture insertion area from picture data that the user has selected, processing such as zooming, trimming and/or rotation, and so on, are automatically carried out in accordance with the key information set in advance.

The picture data which has undergone such processing is delivered to the video memory 1*c* through the picture processing section 12*c* and the switch 12*d*, and is inserted into the picture insertion area designated by the picture processing information included in the key information within the picture data of the template. Then, the picture image of the template in which the picture image based on the picture data is inserted is displayed on the display screen of the monitor unit 15. The user judges on the basis of the picture image displayed on the display screen of the monitor unit 15 whether or not currently displayed picture image is proper, whereby when the user desires to change picture data, he instructs read-out operation of any other picture data. Thus, the picture data newly selected is read out into the first editor memory 1*a*.

The picture processing block 12 carries out processing such as zooming, trimming or rotation, and so on, for a second time with respect to the picture data which has been newly read out in accordance with picture processing information included in the key information. The picture data thus processed is delivered to the video memory 1*c* through the picture processing section 12*c* and the switch 12*d*, and is inserted into the picture insertion area designated by picture processing information included in the key information. Thus, picture image of the template in which the newly selected picture data is inserted is displayed on the display screen of the monitor unit 15. The user carries out a judgment, similarly to the above, whether or not the newly selected picture image is proper.

If the picture image displayed on the display screen of the monitor unit 15 is proper, the user instructs read-out operation of picture data inserted into the next picture insertion area. At this time, the picture synthesis control section 12*b* inserts picture data stored in the first editor memory 1*a* into the picture insertion area designated by the key information in the picture data of the template stored in the second editor memory 1*b*.

Then, the picture data of the template into which new picture data has been inserted in this manner is delivered to the video memory 1*c* through the switch 12*d*. Thus, picture image of the template in which the new picture data has been inserted is displayed on the display screen of the monitor unit 15.

Further, the user successively selects picture data inserted with respect to all picture insertion areas 71*h* to 71*m* by the procedure similar to the above. Then, the picture processing block 12 successively implements processing such as zooming, trimming or rotation, and so on, to the selected picture data similarly to the above in accordance with the picture processing information included in the key information corresponding to the respective picture insertion areas 71*h* to 71*m* thereafter to successively insert them into the respective picture insertion areas 71*h* to 71*m* in the picture data of the template stored in the second editor memory 1*b*. Thus, the picture data that the user has selected is inserted into all the picture insertion areas 71*h* to 71*m* in accordance with the key information. In this manner, a synthetic picture image shown in the FIG. 20 mentioned above is formed.

Thus, in this still picture recording/reproduction system, when the user is required to only select the template and picture data inserted into the template, and a procedure is thus taken to implement processings such as zooming, trimming and/or rotation, and so on, to the selected picture data in accordance with the key A information set in advance in correspondence with the respective templates to insert the picture data thus processed into a predetermined picture insertion area or areas within the template, it is possible to prepare a synthetic picture image. Thus, preparation of synthetic picture image can be easily carried out.

Moreover, in the case where the key information corresponding to the respective templates are recorded in the recording area KA of the optical disc, if the templates and the key information different from each other are respectively recorded on, e.g., plural optical discs 28, implementation of only exchange between optical discs 28 increases the kind of templates which can be used, thus making it possible to prepare wide variety of synthetic picture images.

Further, there may be employed a configuration capable of selecting the select mode to select the respective key information with respect to the respective templates as described above and the automatic mode using key information set in advance in correspondence with the respective templates. In this case, respective key information are selected with respect to respective templates, thereby making it possible to carry out adjustment of zooming, or trimming, and so on, and to easily form synthetic picture image by using the key information set in advance in correspondence with the respective templates.

It is to be noted while the example where the key information is recorded in the recording area KA of the optical disc has been described in the above-described embodiment, key information corresponding to the respective templates may be stored in the key memory 1b in advance. In this case, since there is no necessity of recording key information on the optical disc 28, data recorded onto the optical disc 28 is reduced, thereby making it possible to record larger number of picture data of the template. Moreover, if the key information of the key memory 1b can be rewritten, e.g., plural key information corresponding to the respective templates may be set to select one of these key information to write it into the key memory 1b, thereby making it possible to easily change key information with respect to a single template.

Moreover, while explanation has been made in connection with the configuration in which picture data instructed by the user is read out from the first storage unit 18a and the template and the key information instructed by the user are read out from the second storage unit 18b, if there is employed a configuration to read out picture data instructed by the user from the first storage unit 18a to store it into the first editor memory 1a thereafter to exchange the optical disc 28 to read out the template and the key information from the new optical disc 28, it is sufficient to provide a single storage unit 18.

Further, while explanation has been made by giving actual numeric values such that the frame memory 1 has a memory area of 2048×2048 pixels, and the memory area of 1024×1536 pixels thereof is the picture memory area and the memory area of 16×32 pixels thereof is the command area, this is merely one example. However, it is a matter of course that modification or change may be suitably made in accordance with the specification such that, e.g., the command area is expanded to 40×60 pixels.

What is claimed is:

1. A picture editing apparatus adapted for synthesizing a picture, comprising:
    a first memory for storing picture data;
    a second memory which stores an insertion pattern for inserting the picture data;
    a key memory for storing key information corresponding to the insertion pattern, having area designation information for designating an area of the picture data stored in the first memory; and
    control means operative to control write-in operation of the first memory, the second memory and the key memory on the basis of operation of an operator, and operative to control read-out operation from the first memory of the picture data and read-out operation from the second memory of the insertion pattern on the basis of the key information so that the picture data is inserted with respect to the area indicated by the key information within the insertion pattern.

2. The picture editing apparatus of claim 1,
   wherein the control means comprises read-out control means for reading out, from a first recording medium, the picture data stored into the first memory, and for reading out, from a second recording medium, the insertion pattern and the key information stored into the second memory.

3. The picture editing apparatus of claim 2,
   wherein the second recording medium includes a pattern area where the insertion pattern is recorded and a key information recording area where the key information is recorded, the read-out control means being operative to read out the insertion pattern from the pattern recording area, and to read out the key information from the key information recording area.

4. The picture editing apparatus of claim 3,
   wherein the key information further includes picture processing information for carrying out picture processing of the picture data so as to correspond to the insertion pattern, the control means being operative to allow the picture data to undergo picture processing on the basis of the picture processing information thereafter to insert said processed picture data into the insertion pattern.

5. The picture editing apparatus of claim 4,
   wherein the picture processing information includes shape data for controlling shape of the picture data, the control means being operative to change the picture data so as to correspond to the shape data to insert said chanted picture data into the insertion pattern.

6. The picture editing apparatus of claim 4,
   wherein the picture processing information includes enlargement/contraction data for controlling enlargement and contraction of the picture data, the control means being operative to vary the size of the picture data so as to correspond to the enlargement/contraction data to insert said varied picture data into the insertion pattern.

7. The picture editing apparatus of claim 4,
   wherein the picture processing information includes direction data for controlling direction of the picture data, the control means being operative to change the direction of the picture data so as to correspond to the direction data to insert said picture data having changed direction into the insertion pattern.

8. A picture editing apparatus for synthesizing a picture, comprising:
    a first memory for storing picture data;
    a second memory which stores an insertion pattern for inserting the picture data;
    a key memory for storing key information corresponding to the insertion pattern and consisting of area designation information for designating the area of the picture data stored in the first memory, and picture processing information for designating picture processing carried out with respect to the picture data stored in the first memory; and
    control means for controlling write-in operation of the first memory, the second memory and the key memory on the basis of operation by an operator, and for controlling read-out operation from the first memory of the picture data and read-out operation from the second memory of the insertion pattern so that picture processing is implemented to the picture data on the basis of the picture processing information and the picture data is inserted with respect to the area indicated by the area designation information within the insertion pattern.

9. The picture editing apparatus of claim 8,
   wherein the picture processing information includes shape data for controlling shape of the picture data, the control means being operative to change the picture data so as to correspond to the shape data to insert said changed picture data into the insertion pattern.

10. The picture editing apparatus of claim 8,
    wherein the picture processing information includes enlargement/contraction data for controlling enlargement and contraction of the picture data, the control means being operative to change size of the picture data so as to correspond to the enlargement/contraction data to insert said chanized picture data into the insertion Pattern.

11. The picture editing apparatus of claim 8.
wherein the picture processing includes direction means being operative to change the direction of the picture data so as to correspond to the direction data to insert said picture data having changed direction into the insertion pattern.

12. The picture editing apparatus of claim 1 wherein the key information further includes picture processing information for carrying out picture processing of the picture data so as to correspond to the insertion pattern, the control means being operative to allow the picture data to undergo picture processing on the basis of the picture processing information thereafter to insert said processed picture data into the insertion pattern.

13. The picture editing apparatus of claim 12 wherein the picture processing information includes shape data for controlling shape of the picture data, the control means being operative to change the picture data so as to correspond to the shape data to insert said changed picture data into the insertion pattern.

14. The picture editing apparatus of claim 12 wherein the picture processing information includes enlargement/contraction data for controlling enlargement and contraction of the picture data, the control means being operative to vary size of the picture data so as to correspond to the enlargement/contraction data to insert said varied picture data into the insertion pattern.

15. The picture editing apparatus of claim 12 wherein the picture processing information includes direction data for controlling direction of the picture data, the control means being operative to change the direction of the picture data so as to correspond to the direction data to insert said picture data having changed direction into the insertion pattern.

16. A method of picture synthesizing, said method comprising the steps of:
storing a picture data;
storing an insertion pattern for inserting the picture data;
storing key information corresponding to the insertion pattern and designating an area of the stored picture data; and
operatively controlling the write-in operation for the steps of storing picture data, the insertion pattern, the key information and the step of designating the area of the picture data on the basis of an operator, and operatively controlling the read-out operation of the picture data and the insertion pattern on the basis of the key information so that the picture data is inserted with respect to the area indicated by the key information within the insertion pattern.

17. The method of claim 16 wherein the step of operatively controlling includes the step of reading out, from a first recording medium, the stored picture data, and reading out, from a second recording medium, the stored insertion pattern and the stored key information.

18. The method of claim 17 wherein the second recording medium includes a pattern area where the insertion pattern is recorded and a key information recording area where the key information is recorded, the step of reading out being operative to read out the insertion pattern from the pattern recording area, and to read out the key information from the key information recording area.

19. The method of claim 18 wherein the key information further includes picture processing information for carrying out picture processing of the picture data so as to correspond to the insertion pattern, the step of operatively controlling being operative to allow the picture data to undergo picture processing on the basis of the picture processing information thereafter to insert said processed picture data into the insertion pattern.

20. The method of claim 19 wherein the picture processing information includes shape data for controlling shape of the picture data, the step of operatively controlling being operative to change the picture data so as to correspond to the shape data to insert said changed picture data into the insertion pattern.

21. The method of claim 19 wherein the picture processing information includes enlargement/contraction data for controlling enlargement and contraction of the picture data, the step of operatively controlling being operative to vary the size of the picture data so as to correspond to the enlargement/contraction data to insert said varied picture data into the insertion pattern.

22. The method of claim 19 wherein the picture processing information includes direction data for controlling direction of the picture data, the step of operatively controlling being operative to change the direction of the picture data so as to correspond to the direction data to insert said picture data having changed direction into the insertion pattern.

23. A method of synthesizing a picture, said method comprising the steps of:
storing a picture data;
storing an insertion pattern for inserting the picture data;
storing key information corresponding to the insertion pattern, the key information including area designation information for designating the area of the stored picture data, and picture processing information for designating picture processing carried out with respect to the stored picture data; and
controlling the write-in operation for the steps of storing the picture data, storing the insertion pattern and storing the key information on the basis of an operator, and controlling the read-out operation of the stored picture data and the read-out operation of the insertion pattern so that picture processing is implemented to the picture data on the basis of the picture processing information and the picture data is inserted with respect to the area indicated by the area designation information within the insertion pattern.

24. The method of claim 23 wherein the picture processing information includes shape data for controlling shape of the picture data, the step of controlling being operative to change the picture data so as to correspond to the shape data to insert said changed picture data into the insertion pattern.

25. The method of claim 23 wherein the picture processing information includes enlargement/contraction data for controlling enlargement and contraction of the picture data, the step of controlling being operative to change size of the picture data so as to correspond to the enlargement/contraction data to insert said changed picture data into the insertion pattern.

26. The method of claim 23 wherein the picture processing includes operatively changing the direction of the picture data so as to correspond to the direction data to insert said picture data having changed direction into the insertion pattern.

* * * * *